US008027373B2

(12) United States Patent
Subrahmanya et al.

(10) Patent No.: US 8,027,373 B2
(45) Date of Patent: Sep. 27, 2011

(54) QUICK DETECTION OF SIGNALING IN A WIRELESS COMMUNICATION SYSTEM

(75) Inventors: Parvathanathan Subrahmanya, Sunnyvale, CA (US); Thejaswi Bharadwaj Madapushi Sheshadri, Santa Clara, CA (US); Vivek Chawla, Denver, CO (US)

(73) Assignee: QUALCOMM Incorporated, San Diego, CA (US)

( * ) Notice: Subject to any disclaimer, the term of this patent is extended or adjusted under 35 U.S.C. 154(b) by 1318 days.

(21) Appl. No.: 11/228,045

(22) Filed: Sep. 15, 2005

(65) Prior Publication Data

US 2007/0060095 A1  Mar. 15, 2007

(51) Int. Cl.
*H04B 1/00* (2006.01)
(52) U.S. Cl. ............... 375/149; 375/147; 375/326
(58) Field of Classification Search ............ 455/522
See application file for complete search history.

(56) References Cited

U.S. PATENT DOCUMENTS

| 5,852,638 | A  | * | 12/1998 | Chen et al. ............... 375/344 |
| 5,982,763 | A  |   | 11/1999 | Sato |
| 2001/0036221 | A1 |   | 11/2001 | Sato |
| 2003/0142729 | A1 |   | 7/2003 | Subrahmanya et al. |
| 2003/0143951 | A1 | * | 7/2003 | Challa et al. ............... 455/20 |
| 2003/0206601 | A1 |   | 11/2003 | Shiu |
| 2005/0084036 | A1 |   | 4/2005 | Luo et al. |
| 2005/0117665 | A1 |   | 6/2005 | Becker et al. |

FOREIGN PATENT DOCUMENTS

| CN | 1312979 | 9/2001 |
| EP | 0 820 156 A2 | 1/1998 |
| EP | 1 237 319 A1 | 4/2002 |
| JP | 10032523 A | 2/1998 |
| JP | 2002518930 T | 6/2002 |
| JP | 2002353869 A | 12/2002 |
| JP | 2003507927 T | 2/2003 |
| JP | 2003527788 | 9/2003 |
| JP | 2005527998 T | 9/2005 |

(Continued)

OTHER PUBLICATIONS

Wang et al., "Initial frequency acquisition in W-CDMA",Vehicular Technology Conference, 1999. VTC 1999—Fall. IEEE VTS 50th vol. 2, Sep. 19-22, 1999 pp. 1013-1017.

(Continued)

*Primary Examiner* — Duc Nguyen
*Assistant Examiner* — Ankur Jain
(74) *Attorney, Agent, or Firm* — Howard H. Seo; Kristine U. Ekwueme

(57) ABSTRACT

Quick frequency tracking (QFT), quick time tracking (QTT), and non-causal pilot filtering (NCP) are used to detect sporadically transmitted signaling, e.g., paging indicators. For QFT, multiple hypothesized frequency errors are applied to an input signal to obtain multiple rotated signals. The energies of the rotated signals are computed. The hypothesized frequency error with the largest energy is provided as a frequency error estimate. For QTT, coherent accumulation is performed on the input signal for a first set of time offsets, e.g., early, on-time, and late. Interpolation, energy computation, and non-coherent accumulation are then performed to obtain a timing error estimate with higher time resolution. For NCP, pilot symbols are filtered with a non-causal filter to obtain pilot estimates for one antenna for non-STTD and for two antennas for STTD. The frequency and timing error estimates and the pilot estimates are used to detect the signaling.

48 Claims, 13 Drawing Sheets

FOREIGN PATENT DOCUMENTS

| | | |
|---|---|---|
| JP | 2005538664 | 12/2005 |
| WO | WO 99/66649 A1 | 12/1999 |
| WO | WO 02/27958 A2 | 4/2002 |
| WO | WO 03/024046 A2 | 3/2003 |
| WO | WO2004023679 | 3/2004 |
| WO | WO 2005/072001 A2 | 8/2005 |

OTHER PUBLICATIONS

International Search Report and Written Opinion—PCT/US2006/036489, International Search Authority—European Patent Office—Apr. 18, 2007.

"Performance of Coded DS-CDMA with Pilot-Assisted Channel Estimation and Linear Interference Suppression," IEEE Transactions on Communications, vol. 50, No. 5, May 2002, Wayne G. Phoel, pp. 822-832.

Translation of Office Action in Japanese application 2008-531437 corresponding to U.S. Appl. No. 11/228,045, citing WO2004023679, JP2002518930, JP2002353869, WO2003024046, JP1032523, US20050084036, JP2003507927, JP2003527788, JP2005538664 and JP2005527998. Dated Oct. 26, 2010.

* cited by examiner

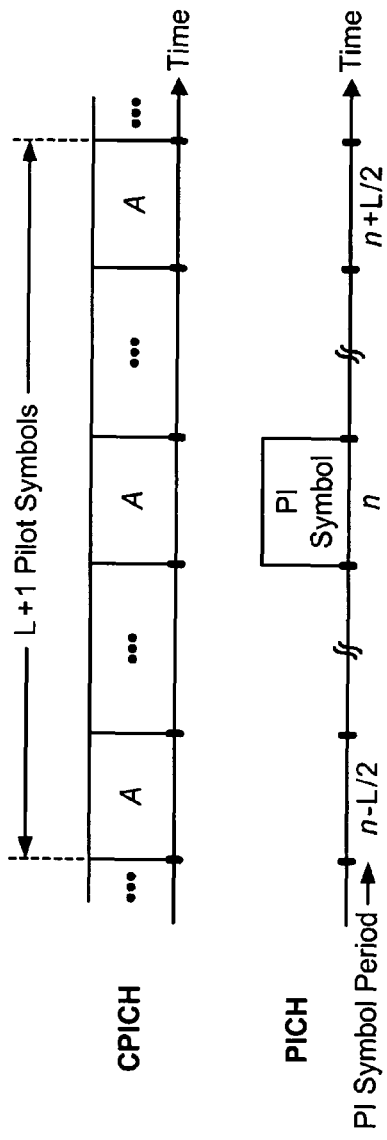
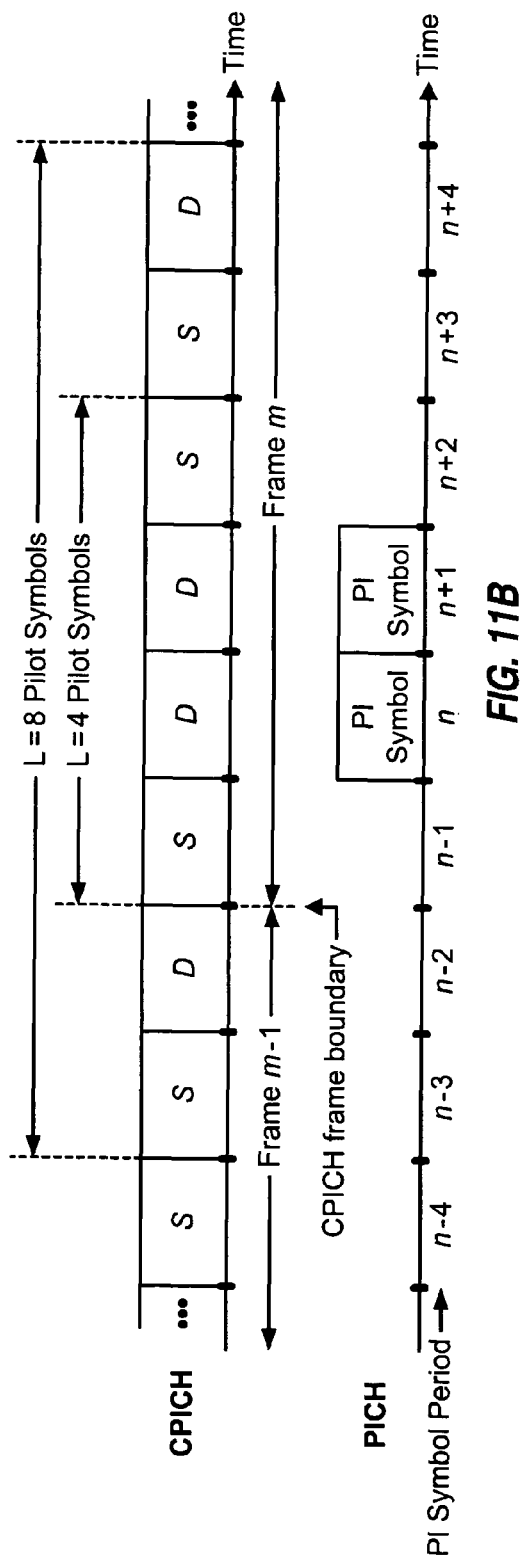
FIG. 11A
FIG. 11B

QUICK DETECTION OF SIGNALING IN A WIRELESS COMMUNICATION SYSTEM

BACKGROUND

I. Field

The present invention relates to communication, and more particularly to techniques for detecting signaling transmitted sporadically in a wireless communication system.

II. Background

A wireless device (e.g., a cellular phone) in a wireless communication system may be designed to operate in one of several modes, such as "active" and "idle", at any given moment. In the active mode, the wireless device can actively exchange data with one or more base stations in the system, e.g., for a voice or data call. In the idle mode, the wireless device may monitor a paging channel (PCH) for messages applicable to the device. Such messages may include page messages that alert the wireless device to the presence of an incoming call and overhead messages that carry system information and other information for the wireless device.

In the idle mode, the wireless device continues to consume power to sustain circuitry needed to monitor the signals transmitted by the base stations in the system. The wireless device may be portable and powered by an internal battery. Power consumption by the wireless device in the idle mode decreases the available battery power, which shortens the standby time between battery recharges and the talk time when a call is placed or received. Hence, it is highly desirable to minimize power consumption in the idle mode to increase battery life.

In one common technique for reducing power consumption in the idle mode, user-specific messages are sent on the paging channel to the wireless device at designated times, if at all. The paging channel may be divided into numbered frames. The wireless device may be assigned specific frames on which it may receive user-specific messages. With such a paging channel, the wireless device can enter discontinuous reception (DRX) operation whereby it periodically, rather than continuously, monitors the paging channel for messages. While in DRX operation, the wireless device wakes up from a "sleep" state prior to its assigned frame, enters an "awake" state and processes the paging channel for messages, and reverts back to the sleep state if additional communication is not required. The wireless device powers down as much circuitry as possible while in the sleep state to conserve battery power.

In another common technique for further reducing power consumption in the idle mode, a paging indicator channel (PICH) is used to indicate whether or not a page message may be sent on the paging channel for the wireless device. The PICH carries paging indicators that are transmitted as binary On/Off values and may be detected quickly. The wireless device is assigned a specific paging indicator prior to each assigned frame on the PCH. The wireless device detects the assigned paging indicator. If the paging indicator indicates that no message will be sent on the paging channel for the wireless device, then the device would not need to process the paging channel and may go to sleep immediately.

The wireless device typically needs to perform certain tasks after waking up from sleep in order to detect the assigned paging indicators. The clock within the wireless device may have drifted, the wireless device may have moved, and/or the channel conditions may have changed during sleep. The wireless device typically needs to reacquire the frequency and timing of the signals transmitted by the base stations and estimate the channel response. The wireless device typically wakes up for a predetermined warm-up period prior to the assigned paging indicator in order to perform the necessary tasks and get ready to detect the paging indicators. It is desirable to minimize the warm-up period in order to reduce battery power consumption and extend battery life.

There is therefore a need in the art for techniques to detect paging indicators in a manner to reduce battery power consumption.

SUMMARY

Techniques for performing quick frequency tracking (QFT), quick time tracking (QTT), and non-causal pilot filtering (NCP) to detect signaling (e.g., paging indicators) transmitted sporadically in a wireless communication system are described herein. These techniques may be used by a wireless device to (1) reduce warm-up time per awake interval during DRX operation in the idle mode, (2) reduce battery power consumption and extend battery standby time, and (3) provide improved detection performance under certain operating scenarios. These techniques may be used for signaling sent from one antenna with no transmit diversity and for signaling sent from two antennas with space-time transmit diversity (STTD). Any one, any combination, or all three techniques may be used for signaling detection.

For QFT, multiple hypothesized frequency errors are applied to an input signal (e.g., despread pilot symbols or descrambled samples) to obtain multiple rotated signals. The energies of the rotated signals are determined, e.g., by performing coherent accumulation followed by energy computation. The largest energy among the energies for the rotated signals is identified, and the hypothesized frequency error with the largest energy is provided as a frequency error estimate.

For QTT, coherent accumulation is performed on the input signal for a first set of time offsets (e.g., early, on-time, and late). Non-coherent accumulation is performed after coherent accumulation. Interpolation is performed on the first set of time offsets to obtain a timing error estimate, which is used for signaling detection. The interpolation may be linear, parabolic, and so on, and may be performed after coherent accumulation or after non-coherent accumulation.

For NCP, pilot symbols are filtered with a non-causal filter to obtain pilot estimates for one antenna for non-STTD and for two antennas for STTD. The pilot estimates are used for signaling detection.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout.

FIGS. 11A, 11B and 11C show different embodiments of performing NCP for non-STTD and STTD.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
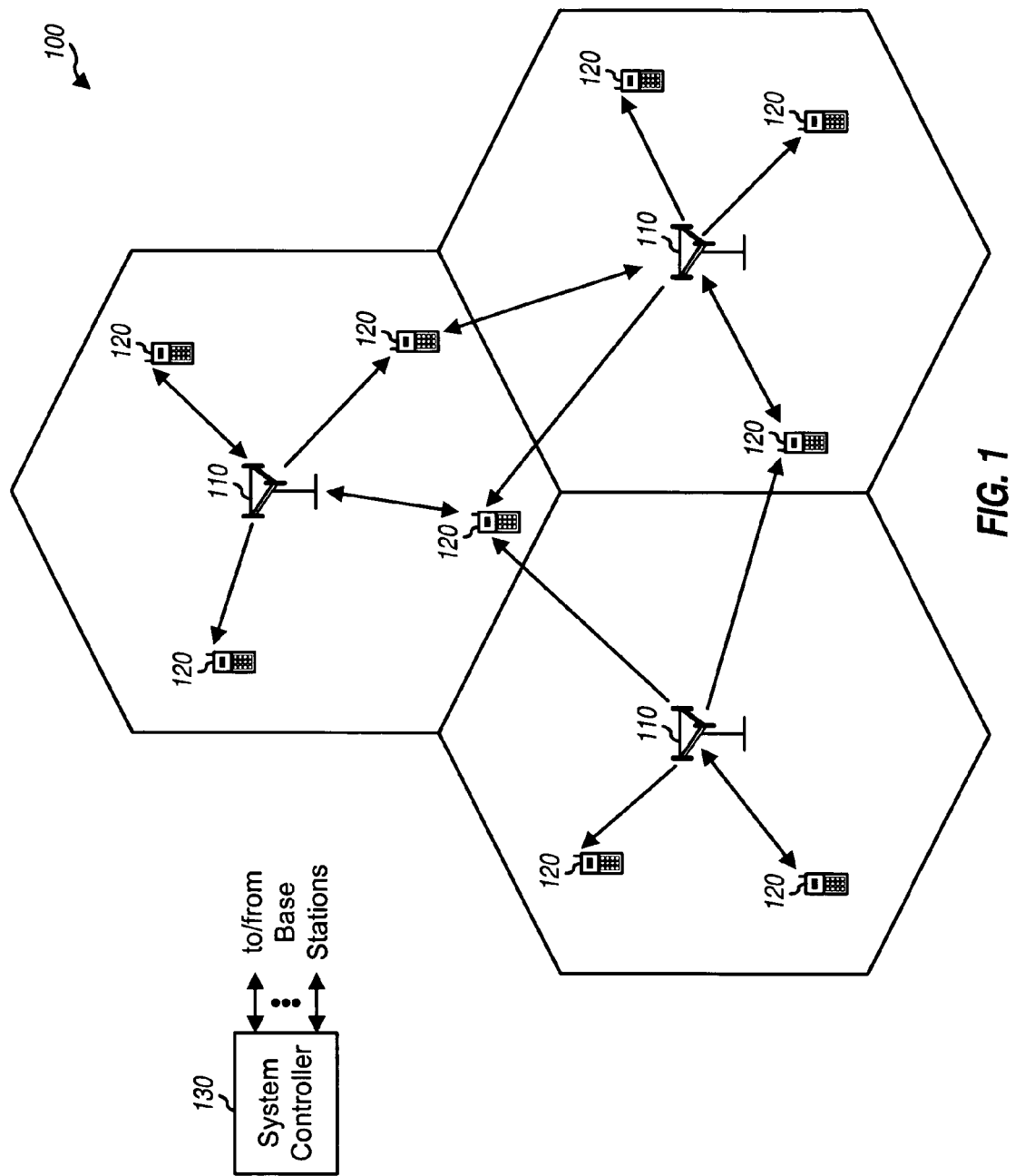
FIG. 1 shows a wireless communication system.

FIG. 1 shows a wireless communication system 100 with multiple base stations 110 and multiple wireless devices 120. A base station is generally a fixed station that communicates with the wireless devices and may also be called a Node B, a base transceiver subsystem (BTS), an access point, or some other terminology. Wireless devices 120 may be dispersed throughout the system. A wireless device may be fixed or mobile and may also be called a mobile station, a user equipment, a terminal, a subscriber unit, or some other terminology. A wireless device may communicate with zero, one, or multiple base stations on the downlink and/or uplink at any given moment. The downlink (or forward link) refers to the communication link from the base stations to the wireless devices, and the uplink (or reverse link) refers to the communication link from the wireless devices to the base stations. A wireless device may also be idle and may receive pilot and signaling from one or more base stations on the downlink.

The signaling detection techniques described herein may be used for various wireless communication systems such as Code Division Multiple Access (CDMA) systems, Time Division Multiple Access (TDMA) systems, Frequency Division Multiple Access (FDMA) systems, and Orthogonal Frequency Division Multiple Access (OFDMA) systems. A CDMA system may implement a radio access technology (RAT) such as Wideband CDMA (W-CDMA), cdma2000, and so on. RAT refers to the technology used for over-the-air communication. A TDMA system may implement a RAT such as Global System for Mobile Communications (GSM). Universal Mobile Telecommunication System (UMTS) is a system that uses W-CDMA and GSM as RATs and is described in documents from a consortium named "3rd Generation Partnership Project" (3GPP). cdma2000 is described in documents from a consortium named "3rd Generation Partnership Project 2" (3GPP2). 3GPP and 3GPP2 documents are publicly available. For clarity, the signaling detection techniques are specifically described below for a W-CDMA system.

Figure 2:
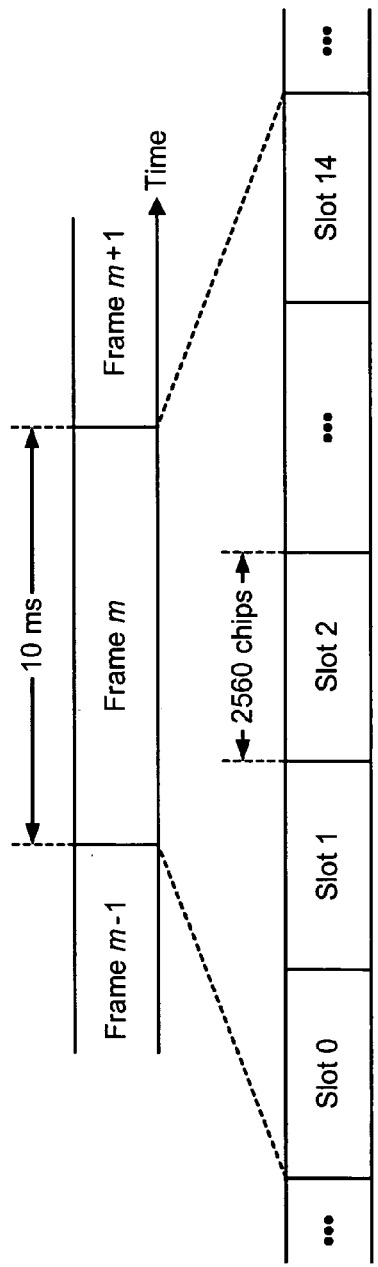
FIG. 2 shows a frame structure in W-CDMA.

FIG. 2 shows a frame structure in W-CDMA. The transmission time line is partitioned into frames. Each frame has a duration of 10 millisecond (ms) and is divided into 15 slots that are assigned indices of 0 through 14. Each slot has a duration of 0.667 ms and spans 2560 chips. Each chip has a duration of $T_c = 0.260$ µs.

Figure 3:
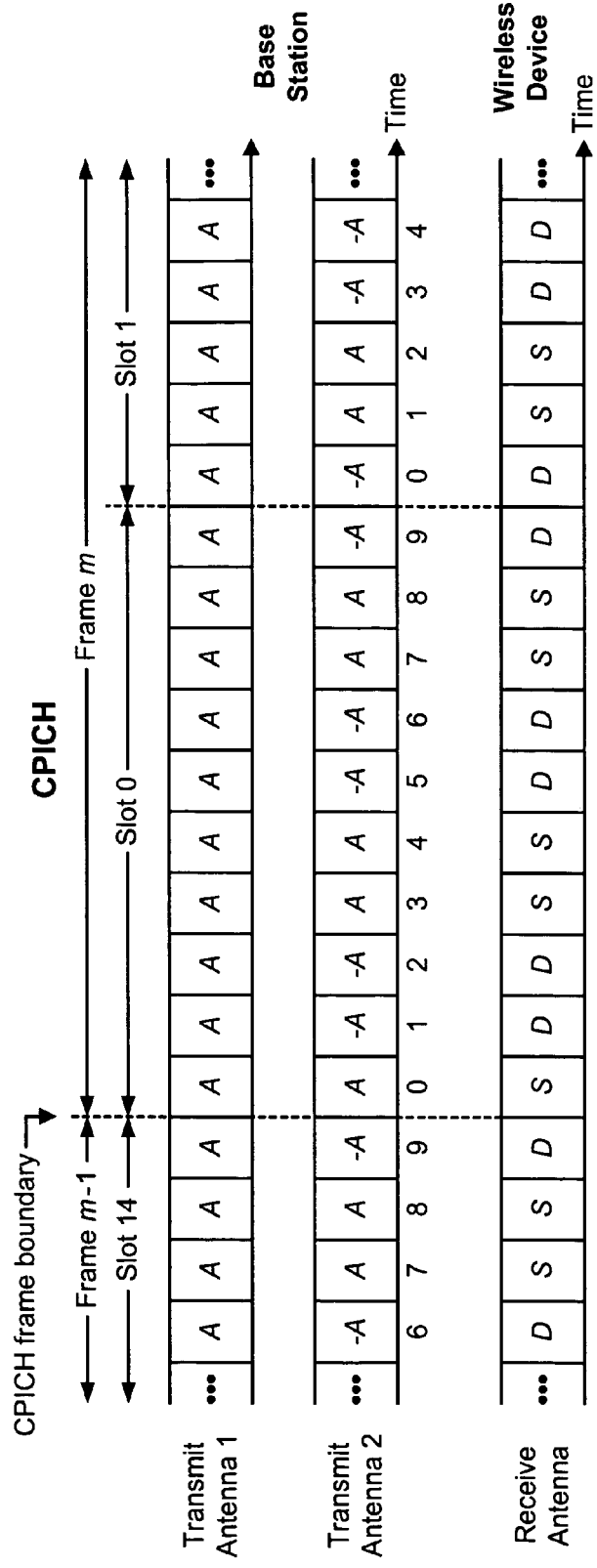
FIG. 3 shows a common pilot channel (CPICH) in W-CDMA.

FIG. 3 shows the common pilot channel (CPICH) in W-CDMA. The CPICH carries predefined modulation symbols that may be used by the wireless devices for frequency and time tracking and channel estimation. The CPICH may be transmitted from either (1) one antenna for no transmit diversity, i.e., non-STTD, or (2) two antennas for STTD. For non-STTD, the symbol sequence for antenna 1 is transmitted from a single base station antenna, where each "A" represents a modulation symbol of 1+j. For STTD, two symbol sequences shown in FIG. 3 are transmitted from two base station antennas. A wireless device receives (1) a sum symbol "S" for each symbol period in which modulation symbols "A" and "A" are transmitted from the two antennas and (2) a difference symbol "D" for each symbol period in which modulation symbols "A" and "−A" are transmitted from the two antennas. The use of the CPICH for signaling detection is described below.

Figure 4A:
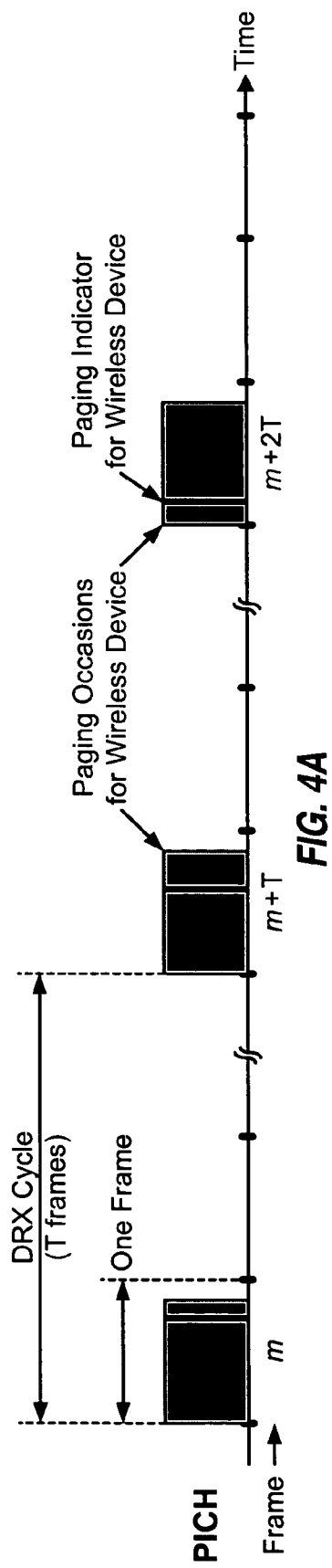
FIG. 4A shows DRX reception of the PICH in W-CDMA.

FIG. 4A shows DRX reception of the PICH in W-CDMA. The PICH is transmitted in 10 ms frames. An idle wireless device is assigned paging occasions, which are specific frames in which the wireless device can receive its paging indicators and page messages. The paging occasions for the wireless device are separated by a time interval called a DRX cycle. The DRX cycle is configurable for the wireless device and can range from 80 ms to 5.12 seconds, or from 8 frames to 512 frames. The DRX cycles and frames for W-CDMA correspond to slot cycles and slots, respectively, in cdma2000.

Figure 4B:
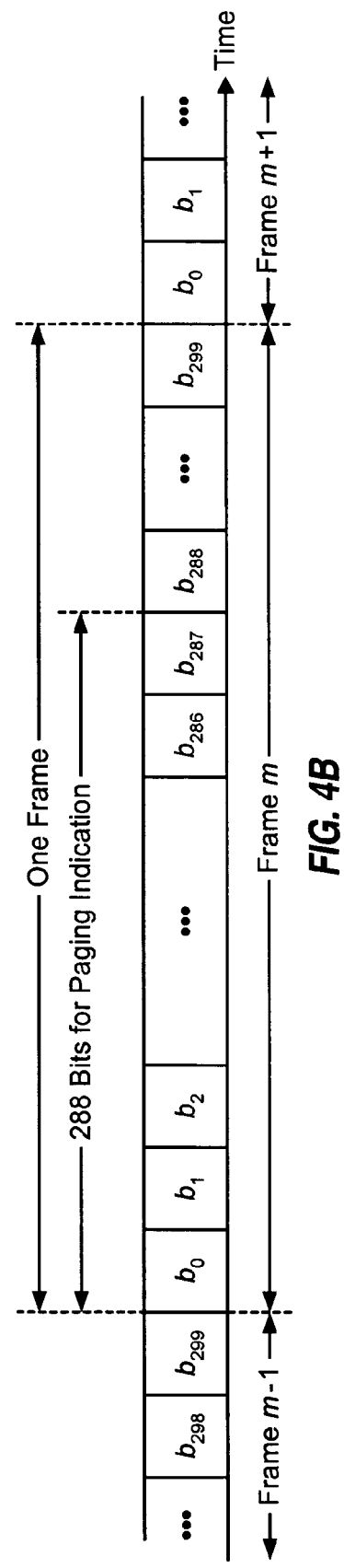
FIG. 4B shows the format of one frame for the PICH.

FIG. 4B shows the format of one frame for the PICH. Each PICH frame includes 300 bits that are labeled as bits $b_0$ through $b_{299}$. The first 288 bits are used for $N_{pi}$ paging indicators (PIs), and the last 12 bits are reserved for other uses. The number of paging indicators ($N_{pi}$) in each PICH frame is configurable by the system and can take on a value of 18, 36, 72 or 144. Each paging indicator is sent in $N_b = 288/N_{pi}$ consecutive bits in the PICH frame, where $N_b$ can take on a value of 16, 8, 4 or 2. The $N_b$ bits for each paging indicator are set to '1' if the paging indicator is equal to '1' and are set to '0' if the paging indicator is equal to '0'. The $N_{pi}$ paging indicators are sent in $N_{pi}$ PI locations that are numbered from 0 through $N_{pi}-1$ (not shown in FIG. 4B).

Figure 4C:
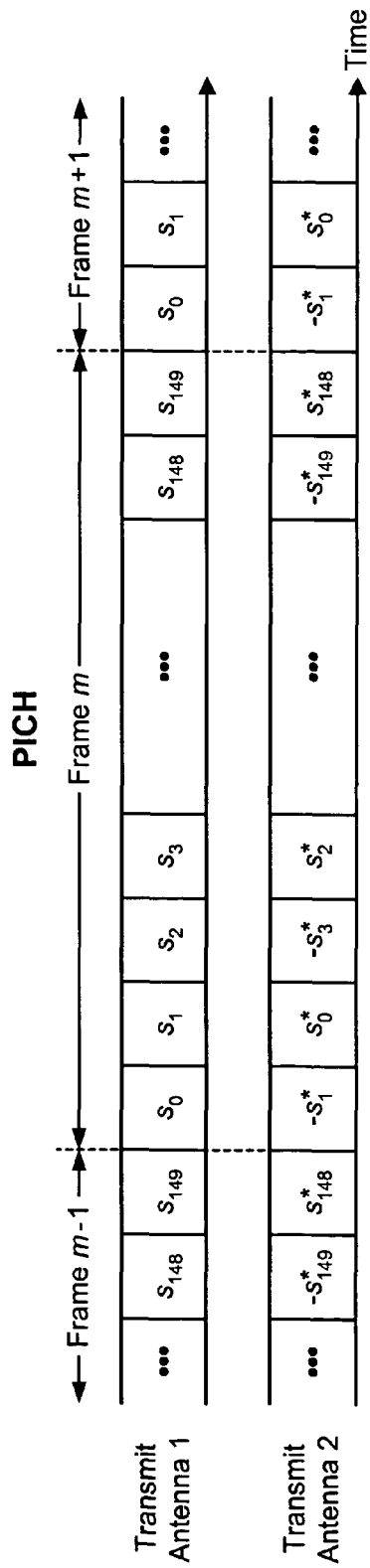
FIG. 4C shows transmission of the PICH for non-STTD and STTD.

FIG. 4C shows transmission of the PICH for non-STTD and STTD. For each PICH frame, the 300 real-valued bits $b_0$ through $b_{299}$ are used to form 150 complex-valued symbols $s_0$ through $s_{149}$ as follows: $s_0 = b_0 + jb_1$, $s_1 = b_2 + jb_3$, and so on, and $s_{149} = b_{298} + jb_{299}$. For non-STTD, the 150 symbols are transmitted from antenna 1 as shown in FIG. 4C, with each symbol spanning 66.67 µs. For STTD, the 150 symbols are transmitted from both antennas 1 and 2, with the symbols for antenna 2 being reordered in time, conjugated ("*"), and possibly inverted, as shown in FIG. 4C.

An idle wireless device is associated with a paging indicator in each paging occasion. The paging indicator is sent at a PI location that is determined by a hash function and can change among the $N_{pi}$ possible PI locations from paging occasion to paging occasion, as shown in FIG. 4A. If the paging indicator for the wireless device is set to '1', then the device processes a secondary common control physical channel (S-CCPCH) to check for messages sent for the wireless device. The S-CCPCH carries the paging channel (PCH), which is a transport channel at a higher layer.

Figure 5:
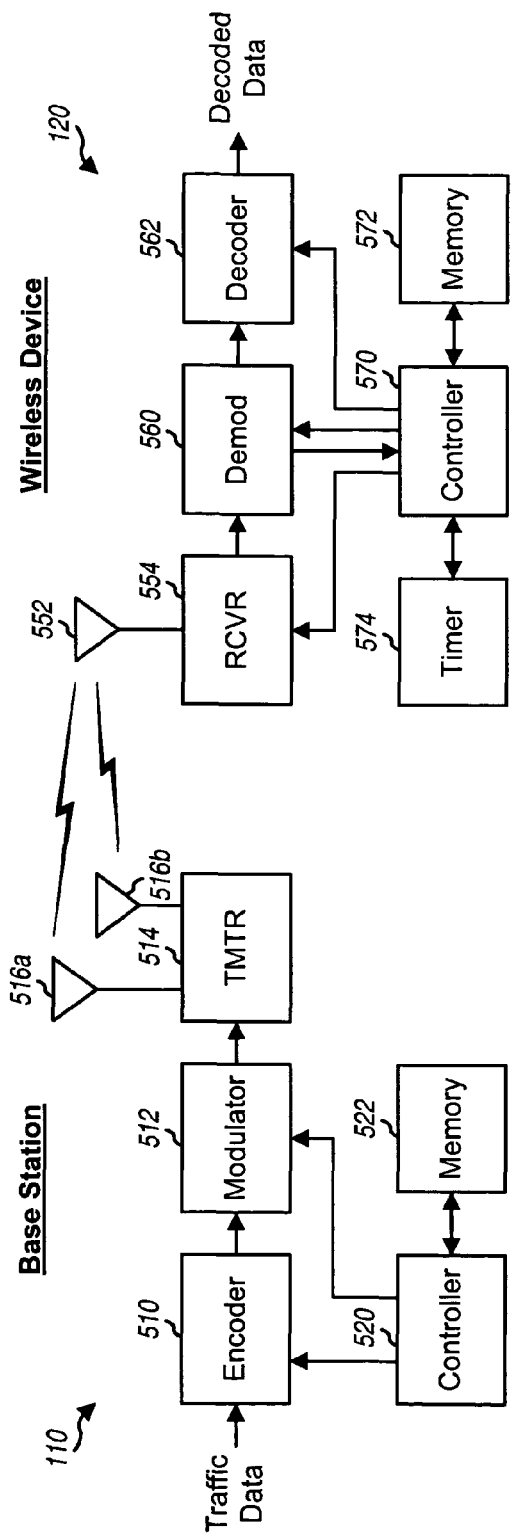
FIG. 5 shows a block diagram of a base station and a wireless device.

FIG. 5 shows a block diagram of a base station 110 and a wireless device 120. At base station 110, an encoder 510 receives traffic data (e.g., for voice and packet data) and overhead data (e.g., for page and other messages) from a controller 520. Encoder 510 processes (e.g., encodes, interleaves, and symbol maps) the different types of data and generates modulation symbols. A modulator 512 receives the modulation symbols for data and signaling (e.g., paging indicators), performs channelization and scrambling on the modulation symbols and signaling for various physical channels (e.g., the PICH, CPICH, S-CCPCH, and so on), and provides a stream of data chips for each antenna. A transmitter unit (TMTR) 514 conditions (e.g., converts to analog, amplifies, filters, and frequency upconverts) each data chip stream to generate a corresponding downlink signal, which is transmitted from an associated antenna 516.

At wireless device 120, an antenna 552 receives the downlink signal(s) from base station 110 and provides a received signal to a receiver unit (RCVR) 554. Receiver unit 554 conditions (e.g., filters, amplifies, and frequency downconverts) the received signal, digitizes the conditioned signal, and provides input samples. A demodulator (Demod) 560 processes the input samples and provides symbol estimates. Demodulator 560 further performs detection for paging indicators as described below. A decoder 562 processes (e.g., symbol demaps, deinterleaves, and decodes) the symbol estimates and provides decoded data.

Controllers 520 and 570 direct the operation at base station 110 and wireless device 120, respectively. Memory units 522 and 572 store data and program codes for controllers 520 and 570, respectively. A timer 574 provides time information, which is used by controller 570 to determine when to wake up to process the PICH during DRX operation.

Figure 6:
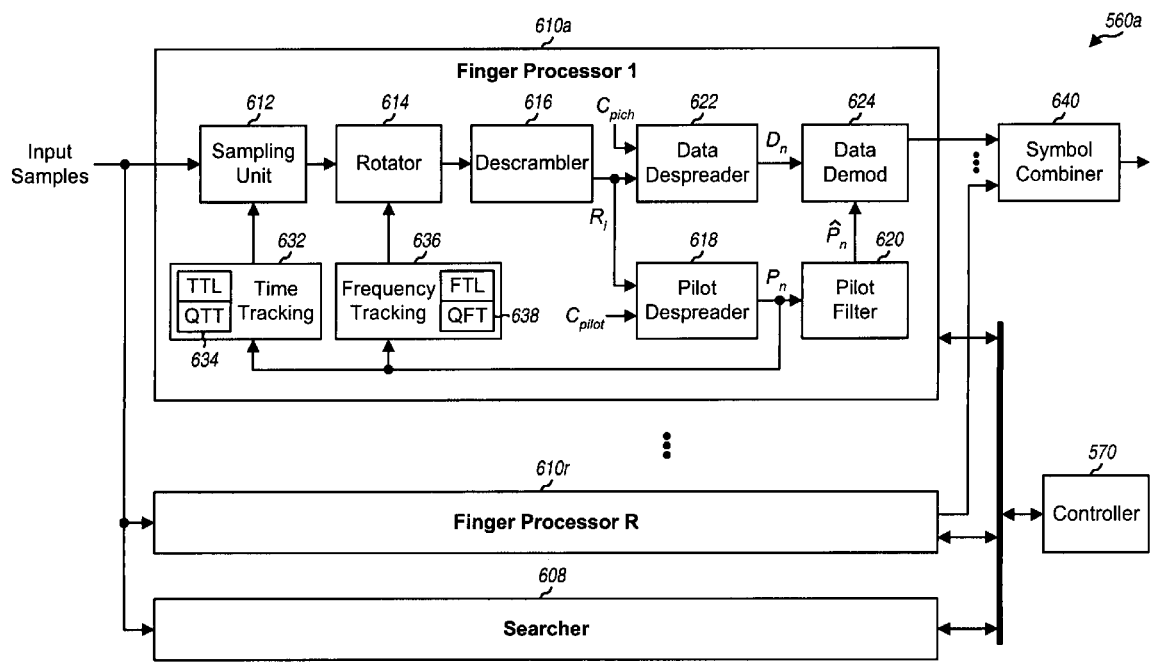
FIG. 6 shows a block diagram of a rake receiver within the wireless device.

FIG. 6 shows a block diagram of a rake receiver 560a, which is one embodiment of demodulator 560 in FIG. 5. Rake receiver 560a includes a searcher 608, R finger processors 610a through 610r, where R>1, and a symbol combiner 640. Searcher 608 searches for strong signal instances (or multipaths) in the received signal and provides the strength and timing of each found multipath that meets a set of criteria. The search processing is known in the art and not described herein.

Figure 9:
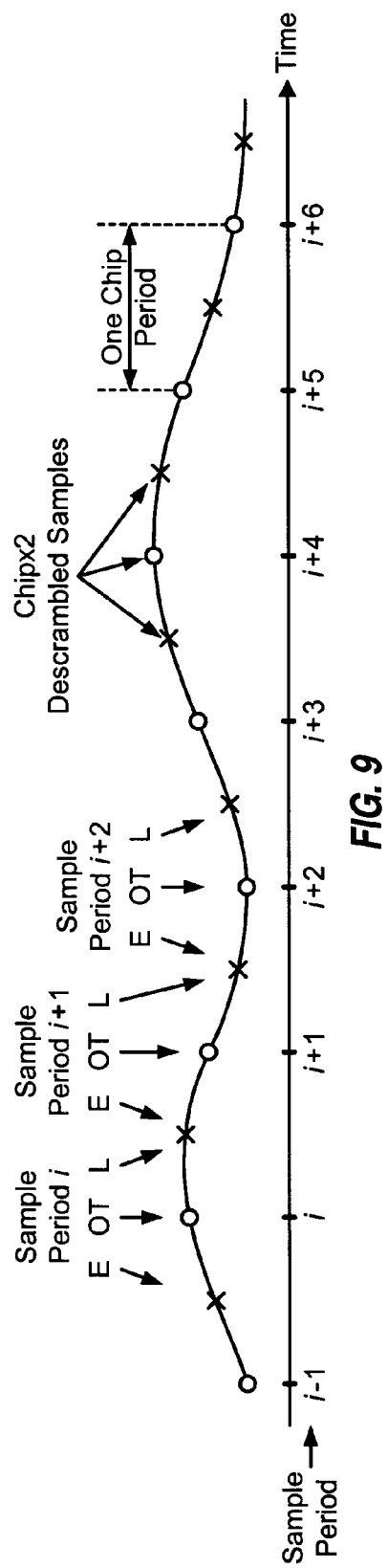
FIG. 9 shows descrambled samples at two times chip rate (or chip×2).

Each finger processor 610 may be assigned to process a different multipath of interest (e.g., a multipath of sufficient strength). Within each finger processor 610, a sampling unit 612 receives the input samples from receiver unit 554 and provides output samples at the proper timing based on a timing error estimate from a time tracking unit 632. For example, sampling unit 612 may receive input samples at eight times the chip rate (or chip×8) and may provide output samples at two times the chip rate (or chip×2), as shown in FIG. 9. The timing of the on-time (OT) output samples may be selected from one of eight possible time offsets for chip×8 based on the timing error estimate. As another example, sampling unit 612 may perform resampling on the input samples based on the timing error estimate to generate the output samples. A rotator 614 performs phase rotation on the output samples from sampling unit 612 based on a frequency error estimate from a frequency tracking unit 636 and provides rotated samples. The timing and frequency error estimates are derived during a warm-up period after waking up from sleep, as described below. A time tracking loop (TTL) and a frequency tracking loop (FTL) are initialized with the timing and frequency error estimates, respectively, and are enabled during the detection of a paging indicator. A descrambler 616 multiplies the rotated samples with a descrambling sequence for a base station being received and provides descrambled samples $R_i$.

To recover the pilot from the CPICH, a pilot despreader 618 multiplies the descrambled samples with a pilot channelization code, $C_{pilot}$, and further accumulates $N_p$ resultant samples to obtain a pilot symbol $P_n$, which may also be called a received pilot symbol or a despread pilot symbol. The channelization codes are OVSF codes in W-CDMA. $N_p$ is the length of the pilot channelization code, which is 256 chips for W-CDMA. A pilot filter 620 filters the pilot symbols and provides pilot estimates $\hat{P}_n$ for the CPICH.

To detect a paging indicator on the PICH, a data despreader 622 multiplies the descrambled samples with a channelization code for the PICH, $C_{pich}$, accumulates the resultant samples over the length of the PICH channelization code (which is 256 chips for W-CDMA), and provides a data symbol $D_n$. A data demodulator 624 performs detection on the data symbols with the pilot estimates and provides symbol estimates. Symbol combiner 640 receives and combines the symbol estimates from all assigned finger processors and provides final symbol estimates. The pertinent blocks within rake receiver 560a are described below.

During DRX operation in the idle mode, wireless device 120 is required to monitor the PCH and respond back to the base station if there is a page for the wireless device. To accomplish this, the wireless device wakes up at regular intervals based on its DRX cycle, as shown in FIG. 4A, and detects the paging indicator on the PICH to determine if a page message might be sent on the S-CCPCH for the wireless device in the following S-CCPCH frame. To reliably detect the paging indicator, the wireless device typically performs frequency tracking to estimate and track out frequency error, time tracking to estimate and track out timing error, and pilot filtering to obtain pilot estimates of sufficient quality. Frequency and time tracking are performed to keep the searcher and finger processors latched to the current channel conditions.

The wireless device may perform frequency tracking, time tracking, and pilot filtering using various techniques. The radio frequency (RF) circuitry within receiver unit 554 is typically turned on for the duration of these tasks. The amount of time needed to perform these tasks is dependent on the specific techniques used for the tasks and may account for a significant fraction of the total RF awake time for each awake interval. The RF awake time has a large impact on battery power consumption in the idle mode. A longer RF awake duration for each awake interval results in higher power consumption and hence shorter battery standby time. Battery standby time has a large impact on acceptability and commercial success of the wireless device. Thus, it is highly desirable to perform these tasks in the shortest amount of time possible.

Table 1 lists three techniques that may be used for frequency tracking, time tracking, and pilot filtering.

TABLE 1

| Technique | Description |
| --- | --- |
| Quick frequency tracking (QFT) | Open-loop technique for estimating frequency error. |
| Quick time tracking (QTT) | Open-loop technique for estimating timing error. |
| Non-causal pilot filtering (NCP) | Use of a non-causal finite impulse response (FIR) filter to derive high quality pilot estimates. |

QFT, QTT, and NCP may be performed on descrambled samples from descrambler 616 or pilot symbols from pilot despreader 618. For clarity, QFT, QTT, and NCP based on pilot symbols are described below. In the following description, coherent accumulation refers to accumulation of complex values, and the phases of the complex values affect the accumulation result. Non-coherent accumulation refers to accumulation of real values, e.g., energies.

1. Quick Frequency Tracking (QFT)

QFT is an open-loop frequency estimation technique that can provide a frequency error estimate in a fixed amount time regardless of the amount of frequency error and the channel conditions. This is in contrast to a closed-loop frequency estimation technique that requires longer time for a larger frequency error and/or poor channel conditions. QFT may be used to provide a quick one-shot frequency error estimate at each awake interval. For QFT, the pilot symbols are rotated with different hypothesized frequency errors, the pilot energy is computed for each hypothesized frequency error, and the hypothesized frequency error with the largest pilot energy is provided as the frequency error estimate.

A complex-valued pilot symbol from pilot despreader 618 may be expressed as:

$$P_n = P_{I,n} + jP_{Q,n} \qquad \text{Eq (1)}$$
$$= (S_p \cdot \text{sinc}(\Delta f \cdot T_p) \cdot \cos\theta + S_w \cdot w_I^p) + j(S_p \cdot \text{sinc}(\Delta f \cdot T_p) \cdot \sin\theta + S_w \cdot w_Q^p)$$

where
$P_n$, is the pilot symbol for pilot symbol period n;
$P_{I,n}$ and $P_{Q,n}$ are inphase (I) and quadrature (Q) pilot components, respectively;
$S_p = N_p \cdot \sqrt{2E_c/I_o}$ and $S_w = \sqrt{N_p} \cdot \sqrt{2N_t/I_o}$;
$E_c/I_o$ is the pilot energy-per-chip-to-total-noise ratio;
$N_t = I_o - I_{or}$ is the total noise minus noise on the pilot scrambling code;
$\Delta f$ is the actual frequency error in the pilot symbol;
$T_p = N_p \cdot T_c$ is the duration of one pilot symbol;
$\theta$ is the phase of the pilot symbol; and
$w_I^P$ and $w_Q^P$ are Gaussian noise for the I and Q pilot components, respectively, with zero mean and unit variance.

The phase term $\theta$ may be expressed as:

$$\theta = 2\pi \cdot \Delta f \cdot N_p \cdot T_c + \phi = \Phi + \phi, \qquad \text{Eq (2)}$$

where
$\phi$ is the random phase of the pilot symbol; and
$\Phi$ is the phase shift per pilot symbol period caused by the frequency error $\Delta f$ Equation (1) indicates that coherent accumulation of the descrambled samples by pilot despreader 618 in the presence of frequency error $\Delta f$ results in the sinc ($\Delta f \cdot T_p$) term appearing in both the I and Q pilot components. This sinc ($\Delta f \cdot T_p$) term represents degradation in the magnitude of the I and Q pilot components due to the frequency error.

The pilot symbols may be coherently accumulated, and the pilot energy, $E_p$, may be computed as follows:

$$E_p = \left[\sum_{n=1}^{N_{fc}} P_{I,n}\right]^2 + \left[\sum_{n=1}^{N_{fc}} P_{Q,n}\right]^2, \qquad \text{Eq (3)}$$

where $N_{fc}$ is the coherent accumulation length, in number of pilot symbols. The pilot energy $E_p$ includes a sinc$^2$ ($\Delta f \cdot N_{fc} \cdot T_p$) term that represents the degradation from peak pilot energy due to the frequency error $\Delta f$.

Figure 7:
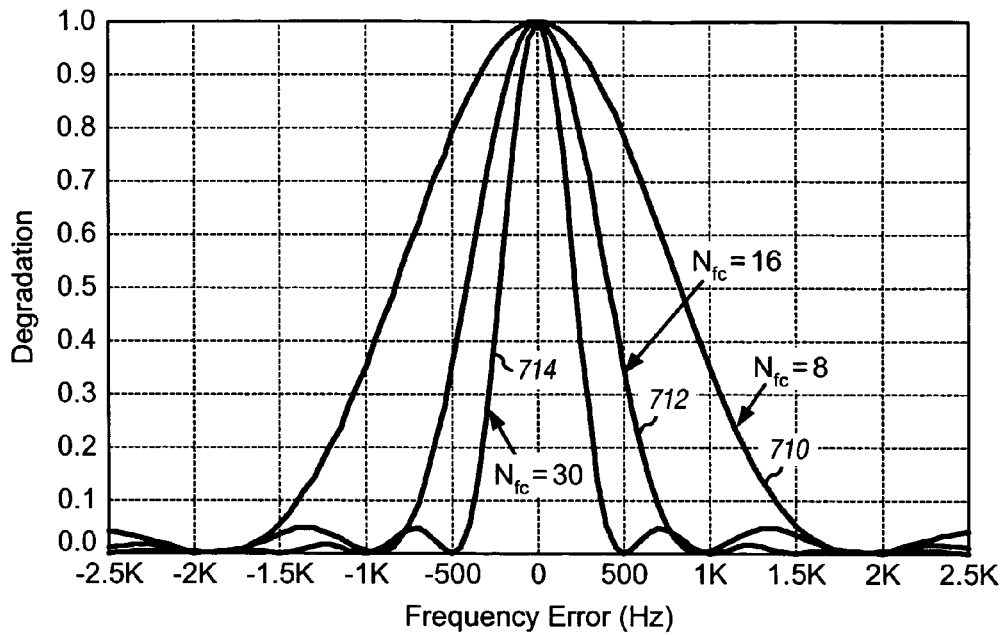
FIG. 7 shows plots of sinc² functions versus frequency error.

FIG. 7 shows plots of the degradation term sinc$^2$ ($\Delta f \cdot N_{fc} \cdot T_p$) as a function of frequency error for different values of $N_{fc}$. Plot 710 is for a coherent accumulation length of $N_{fc}=8$ pilot symbols, plot 712 is for $N_{fc}=16$, and plot 714 is for $N_{fc}=30$. For a given value of $N_{fc}$, the pilot energy is maximum with no frequency error ($\Delta f=0$) and decreases based on a sinc function as the frequency error increases. A larger value of $N_{fc}$ corresponds to a more narrow curve for the sinc$^2$ ($\Delta f \cdot N_{fc} \cdot T_p$) term, which allows for easier detection of zero or low frequency errors based on the pilot energy since the sinc term drops off more abruptly for larger frequency errors. A larger $N_{fc}$ value results in more distinction among pilot energies for different frequency errors.

Figure 8A:
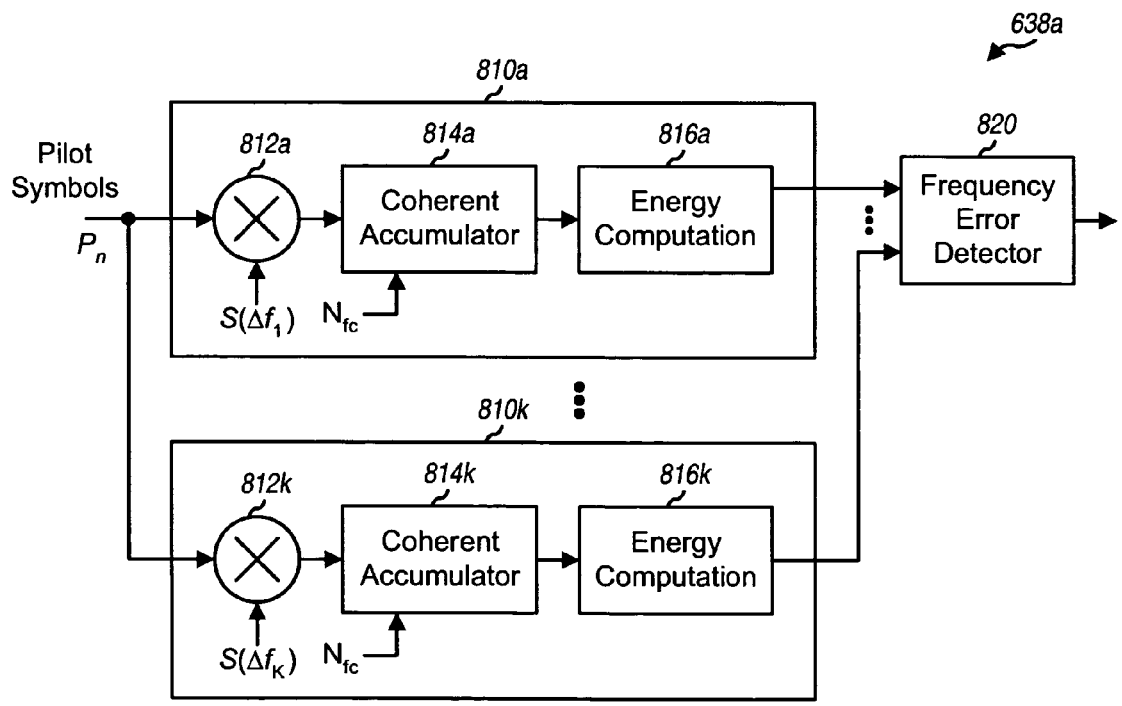
FIGS. 8A and 8B show QFT units for non-STTD and STTD, respectively.

FIG. 8A shows a block diagram of an embodiment of a QFT unit 638a for non-STTD. QFT unit 638a may be used for frequency tracking unit 636 for one finger processor 610, as shown in FIG. 6. QFT unit 638a includes K pilot processors 810a through 810k, where K>1, and a frequency error detector 820. Each pilot processor 810 performs processing for a different hypothesized frequency error.

The pilot symbols from pilot despreader 618 are provided to all K pilot processors 810a through 810k. Within each processor 810, a multiplier 812 multiplies each pilot symbol $P_n$ with a phasor $S(\Delta f_k) = \exp(-j2\pi \cdot \Delta f_k \cdot n \cdot T_p)$ and provides a rotated pilot symbol $P_{k,n}$, where $\Delta f_k$ is the hypothesized frequency error for that processor 810. The rotation of the pilot symbols by the hypothesized frequency error $\Delta f_k$ results in the frequency error for the rotated pilot symbols becoming $\Delta f - \Delta f_k$ and the sinc term in equation (1) becoming sinc (($\Delta f - \Delta f_k$)·$T_p$) after the rotation. A coherent accumulator 814 accumulates $N_{fc}$ rotated pilot symbols, as follows:

$$P_{I,k,acc} = \sum_{n=1}^{N_{fc}} P_{I,k,n}, \text{ and} \qquad \text{Eq (4)}$$

$$P_{Q,k,acc} = \sum_{n=1}^{N_{fc}} P_{Q,k,n},$$

where $P_{k,n} = P_{I,k,n} + jP_{Q,k,n}$. The coherent accumulation length $N_{fc}$ may be a fixed value or a configurable value that is determined based on expected channel conditions. An energy computation unit 816 computes the pilot energy as follows:

$$E_k = P_{I,k,acc}^2 + P_{Q,k,acc}^2. \qquad \text{Eq (5)}$$

Because of the rotation by $\exp(-j2\pi \cdot \Delta f_k \cdot n \cdot T_p)$, the degradation term for the pilot energy becomes sinc$^2$ (($\Delta f - \Delta f_k$)·$N_{fc} \cdot T_p$). The degradation in the pilot energy due to frequency error reduces as the hypothesized frequency error $\Delta f_k$ approaches the actual frequency error $\Delta f$. Frequency error detector 820 receives the pilot energies from all K pilot processors 810a through 810k and identifies the largest pilot energy. Detector 820 then provides the hypothesized frequency error $\Delta f_{k,max}$ corresponding to the largest pilot energy, which is the hypothesis that is closest to the actual frequency error, as the frequency error estimate, or $\Delta \hat{f} = \Delta f_{k,max}$.

Figure 8B:
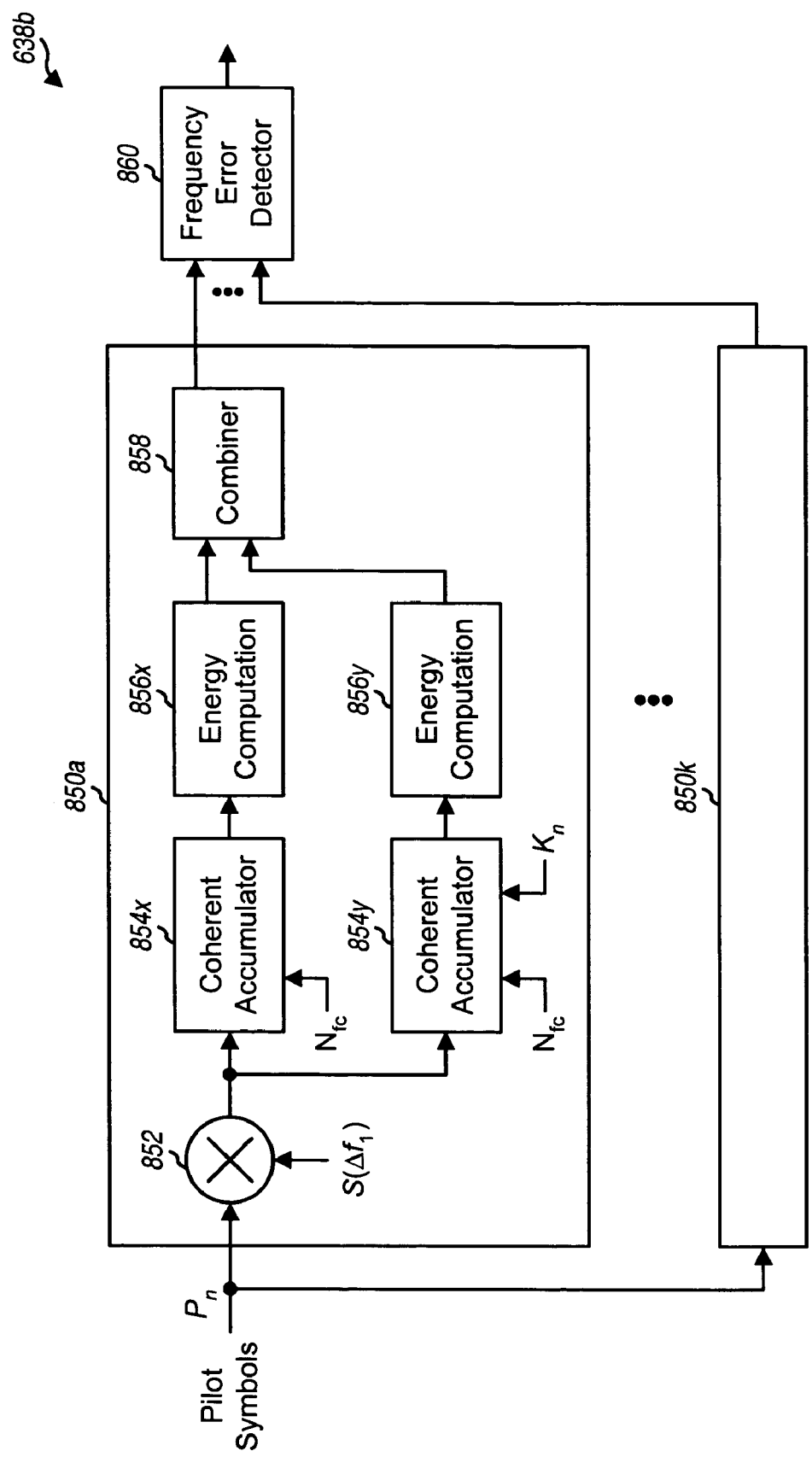

FIG. 8B shows a block diagram of an embodiment of a QFT unit 638b for STTD. QFT unit 638b includes K pilot processors 850a through 850k and a frequency error detector 860. Each pilot processor 850 performs processing for a different hypothesized frequency error. The pilot symbols are provided to all K pilot processors 850a through 850k. Within each processor 850, a multiplier 852 multiplies each pilot symbol $P_n$ with a phasor $S(\Delta f_k)$ and provides a rotated pilot symbol. The rotated pilot symbols from multiplier 852 are provided to two coherent accumulators 854x and 854y for two base station antennas. Accumulator 854x accumulates $N_{fc}$ rotated pilot symbols as shown in equation set (4). Accumulator 854y accumulates $N_{fc}$ rotated pilot symbols as follows:

$$P_{2,I,k,acc} = \sum_{n=1}^{N_{fc}} P_{I,k,n} \cdot K_n, \quad \text{and} \qquad \text{Eq (6)}$$

$$P_{2,Q,k,acc} = \sum_{n=1}^{N_{fc}} P_{Q,k,n} \cdot K_n,$$

where $K_n$ is a gain that is equal to +1 for "S" pilot symbols and −1 for "D" pilot symbols in FIG. 3. Equation set (6) performs both STTD decoding for the CPICH and coherent accumulation. The coherent accumulation period $N_{fc}$ is an even number of pilot symbols for STTD.

Energy computation units 856x and 856y compute the pilot energies for the outputs of accumulators 854x and 854y, respectively, as shown in equation (5). A combiner 858 sums the pilot energies from units 856x and 856y and provides an overall pilot energy for the hypothesized frequency error. A frequency error detector 860 receives the overall pilot energies for all K hypothesized frequency errors and provides the hypothesized frequency error corresponding to the largest overall pilot energy as the frequency error estimate.

The complexity and processing time for QFT are dependent on three parameters: the coherent accumulation length ($N_{fc}$), the number of frequency error hypotheses (K), and the range of hypothesized frequency errors. The frequency error range is determined by the expected worst-case frequency drift (e.g., due to Doppler and temperature change) from one awake interval to the next awake interval. The frequency error range may be determined based on the DRX cycle, the oscillator design, and so on. A larger frequency error range may be assumed for a longer DRX cycle, and vice versa. The number of hypotheses (K) may be selected based on the frequency error range, the desired precision for the frequency error estimate, and the amount of time to allocate for QFT. In general, greater precision and smaller standard deviation in the frequency error estimate may be obtained with more hypotheses. The K hypotheses may be distributed (1) uniformly across the entire frequency error range or (2) non-uniformly with smaller frequency error spacing being used in any subrange with a higher likelihood of containing the actual frequency error. A longer accumulation length can reduce both the peak residual frequency error and the standard deviation of the residual error for (1) an AWGN channel and (2) a Rayleigh fading channel at low speeds. The residual frequency error is the difference between the actual frequency error and the frequency error estimate, or $\Delta f_{res} = \Delta f - \Delta \hat{f}$.

FIGS. 8A and 8B show derivation of the frequency error estimate for one finger processor. Multiple finger processors may be assigned to process multiple signal instances or multipaths. A common frequency error estimate may be computed for all assigned finger processors in various manners.

In one embodiment, the frequency error estimate is determined for each assigned finger processor as shown in FIG. 8A. The common frequency error estimate may then be computed based on the frequency error estimates for all assigned finger processors, as follows:

$$\Delta f_{com} = \sum_{r=1}^{R} \Delta \hat{f}_r \cdot C_r, \qquad \text{Eq (7)}$$

where $\Delta \hat{f}_r$ is the frequency error estimate for finger processor r;
$C_r$ is a weight for finger processor r; and $\Delta f_{com}$ is the common frequency error estimate for all assigned finger processors.

The weight $C_r$ for each finger processor may be equal to $E_c/I_o$ or some other quality metric for that finger processor.

In another embodiment, the pilot energies are first accumulated across all assigned finger processors for each hypothesized frequency error, as follows:

$$E_{k,total} = \sum_{r=1}^{R} E_{r,k}, \qquad \text{Eq (8)}$$

where $E_{r,k}$ is the pilot energy for finger processor r for hypothesized frequency error $\Delta f_k$; and $E_{k,total}$ is the total pilot energy for all assigned finger processors with $\Delta f_k$.

The hypothesized frequency error corresponding to the largest total pilot energy is then provided as the common frequency error estimate.

Frequency tracking may be performed in various manners. In an embodiment, the common frequency error estimate is applied to an oscillator that determines the frequency of a local oscillator (LO) signal used for frequency downconversion. Each finger processor performs frequency tracking based on the residual frequency error determined for that finger processor. In another embodiment, each finger processor performs frequency tracking based on the frequency error estimate derived for that finger processor. In yet another embodiment, frequency tracking is performed across all finger processors based on the common frequency error estimate.

2. Quick Time Tracking (QTT)

QTT is an open-loop timing estimation technique that can provide a timing error estimate in a fixed amount time regardless of the amount of timing error and the channel conditions. This is in contrast to a closed-loop timing estimation technique that requires longer time for a larger timing error and/or poor channel conditions. QTT may be used to provide a quick one-shot timing error estimate at each awake interval.

FIG. 9 shows descrambled samples at chip×2 for one finger processor 610. For each chip period i, the on-time (OT) sample is the descrambled sample at that chip timing, the early (E) sample is the descrambled sample ½ chip earlier, and the late (L) sample is the descrambled sample ½ chip later. The early, on-time, and late samples are thus ½ chip apart. The late sample for chip period i is also the early sample for chip period i+1.

Descrambler 616 may provide descrambled samples at chip×2. Pilot despreader 618 may perform despreading on the chip×2 descrambled samples and provide early (E), on-time (OT), and late (L) pilot symbols. For each pilot symbol period, pilot despreader 618 may accumulate $N_p$ on-time samples to obtain an on-time pilot symbol, $N_p$ early samples to obtain an early pilot symbol, and $N_p$ late samples to obtain a late pilot symbol. The early, on-time, and late pilot symbols are ½ chip apart and may be used to estimate timing error.

Figure 10:
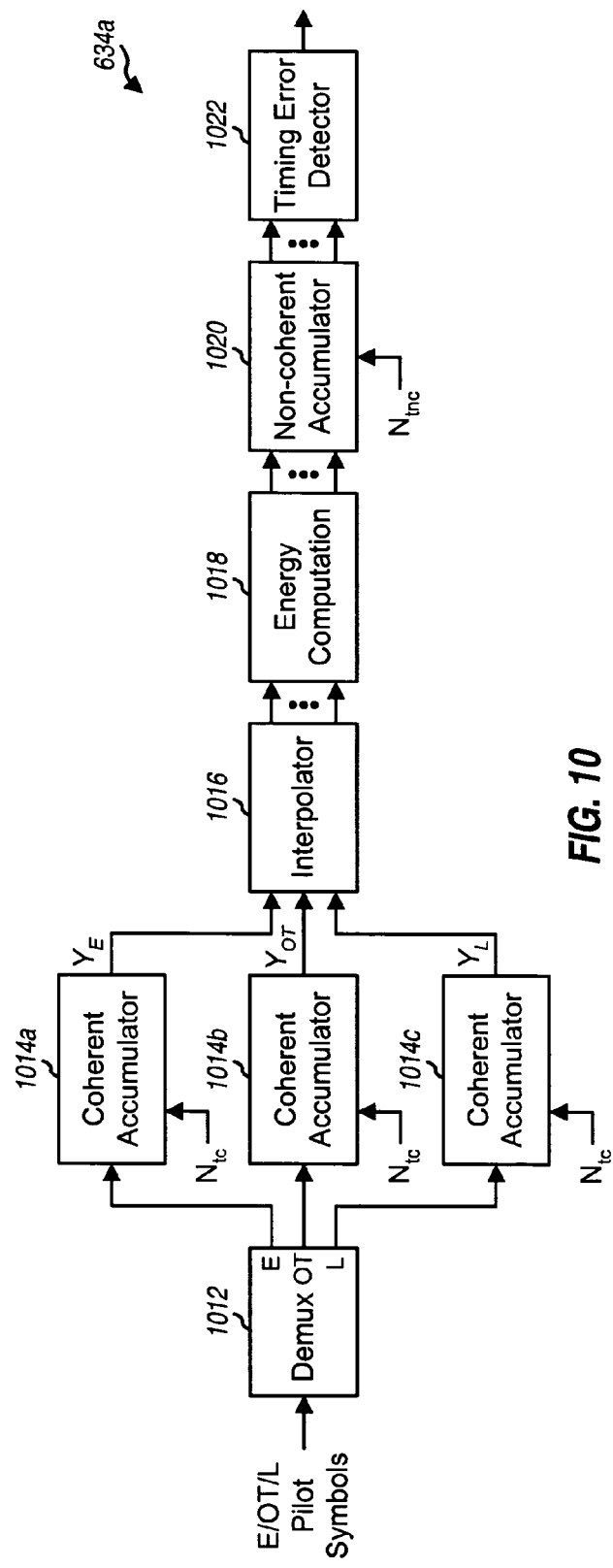
FIG. 10 shows a QTT unit for non-STTD.

FIG. 10 shows a block diagram of an embodiment of a QTT unit 634a for non-STTD. QTT unit 634a may be used for time tracking unit 632 for one finger processor 610, as shown in FIG. 6. Within QTT unit 634a, a demultiplexer 1012 receives the early, on-time, and late pilot symbols from pilot despreader 618, provides early pilot symbols to a coherent accumulator 1014a, provides on-time pilot symbols to a coherent accumulator 1014b, and provides late pilot symbols to a coherent accumulator 1014c. Each accumulator 1014 accumulates its pilot symbols over a coherent accumulation length $N_{tc}$ and provides a pilot value for that period. An interpolator 1016 receives an early pilot value $Y_E$, an on-time value $Y_{OT}$, and a late pilot value $Y_L$ from accumulators 1014a, 1014b, and 1014c, respectively, for each coherent accumulation period. In an embodiment, interpolator 1016 performs linear interpolation on the early, on-time, and late pilot values, as follows:

$$Y_{E+1/8}=(51/64)\cdot Y_E+(17/64)\cdot Y_{OT},\ Y_{OT+3/8}=(51/64)\cdot Y_L+(17/64)\cdot Y_{OT},$$

$$Y_{E+1/4}=(35/64)\cdot Y_E+(35/64)\cdot Y_{OT},\ Y_{OT+1/4}=(35/64)\cdot Y_L+(35/64)\cdot Y_{OT},$$

$$Y_{E+3/8}=(17/64)\cdot Y_E+(51/64)\cdot Y_{OT},\ Y_{OT+1/8}=(17/64)\cdot Y_L+(51/64)\cdot Y_{OT} \qquad \text{Eq (9)}$$

In equation set (9), the weights are selected to provide good performance for linear interpolation. Other weights may also be used.

For each coherent accumulation period, interpolator 1016 provides eight pilot values for eight different time offsets of one chip period, or chip×8 time offsets. An energy computation unit 1018 computes the energy of each pilot value received from interpolator 1016 and, for each coherent accumulation period, provides eight energy values for the eight different time offsets. A non-coherent accumulator 1020 accumulates $N_{mc}$ energy values for each time offset and provides an accumulated energy value for that time offset. A timing error detector 1022 receives eight accumulated energy values for the eight time offsets, identifies the largest accumulated energy value, determines the time offset corresponding to the largest accumulated energy value, and provides the difference between this time offset and the on-time position as the timing error estimate.

In another embodiment, the QTT unit performs parabolic interpolation to obtain the timing error estimate. For this embodiment, the energy of each pilot value from accumulators 1014a, 1014b, and 1014c is computed. $N_{mc}$ energy values for early pilot symbols are accumulated to obtain an early energy value $E_E$, $N_{mc}$ energy values for on-time pilot symbols are accumulated to obtain an on-time energy value $E_{OT}$, and $N_{mc}$ energy values for late pilot symbols are accumulated to obtain a late energy value $E_L$. The timing error estimate is then computed as follows:

$$\Delta\hat{t} = \frac{E_L - E_E}{2E_{OT} - E_E - E_L}. \qquad \text{Eq (10)}$$

Parabolic interpolation attempts to fit a parabola through the three points $E_E$, $E_{OT}$ and $E_L$. The peak position of the parabola is provided as the timing error estimate.

For both linear and parabolic interpolation, the coherent accumulation length $N_{tc}$ and the non-coherent accumulation length $N_{mc}$ may be selected to provide the desired performance. QTT may be performed in parallel with QFT. In this case, the descrambled samples and the pilot symbols will likely have frequency error that has not been tracked out. Hence, the coherent accumulation length should be limited. The total time required for QTT may be selected to approximately match the total time required for QFT. In this case, the total accumulation length for QTT may be approximately equal to the coherent accumulation length for QFT, or $N_{tc} \times N_{mc} \approx N_{fc}$. Various combinations of ($N_{tc}$, $N_{mc}$) were evaluated for different channel conditions. Combinations of (5, 6) and (3, 10) provide good performance for the tested channel conditions. Other combinations of ($N_{tc}$, $N_{mc}$) may also be used, and this is within the scope of the invention.

For STTD with linear interpolation, coherent accumulation is performed separately for the two base station antennas to obtain a set of early, on-time, and late pilot values for each antenna. Linear interpolation is performed on the early, on-time, and late pilot values for each antenna to obtain a set of eight pilot values at eight time offsets for that antenna. Energies are computed for each of the eight pilot values for each antenna. The energies of the pilot values for the two antennas are non-coherently accumulated for each of the eight time offsets. The timing error estimate is then obtained based on the time offset of the largest accumulated energy value.

The pilot values for each antenna may be derived as follows:

$$Y_{1,tos} = \sum_{n=1}^{N_{fc}} P_{tos,n}, \text{ and}$$

$$Y_{2,tos} = \sum_{n=1}^{N_{fc}} P_{tos,n} \cdot K_n, \qquad \text{Eq (11)}$$

where
- "tos" denotes time offset, which may be early (E), on-time (OT), or late (L);
- $P_{tos,n}$ is the pilot symbol at the designated time offset in pilot symbol period n;
- $K_n$ is equal to +1 for "S" pilot symbols and −1 for "D" pilot symbols; and
- $Y_{1,tos}$ and $Y_{2,tos}$ are pilot values at the designated time offset for antennas 1 and 2, respectively.

Equation set (11) performs both STTD decoding for the CPICH and coherent accumulation. For each coherent accumulation period, equation set (11) provides a first set of pilot values $Y_{1,E}$, $Y_{1,OT}$ and $Y_{1,L}$ for antenna 1 and a second set of pilot values $Y_{2,E}$, $Y_{2,OT}$ and $Y_{2,L}$ for antenna 2.

The three pilot values in the first set are interpolated as shown in equation set (9) to obtain a first set of eight pilot values. The three pilot values in the second set are also interpolated to obtain a second set of eight pilot values. The energies of the eight pilot values in each set are computed for each antenna. The energies of the eight pilot values in the two sets for the two antennas are combined for each time offset. Non-coherent accumulation and timing error detection are then performed as described above for non-STTD. For STTD, $N_{tc}$ is an even value, and combinations of (4, 7) and (6, 5) provide good performance for the tested channel conditions.

For both non-STTD and STTD and for both linear and parabolic interpolation, the coherent accumulation length $N_{tc}$ and the non-coherent accumulation length $N_{mc}$ may be selected based on the expected channel conditions. Shorter accumulation lengths may be used for favorable channel conditions so that the time needed to perform QTT can be reduced.

The description above is for derivation of the timing error estimate for one finger processor. Multiple finger processors may be assigned to process multiple signal instances. A timing error estimate may be derived for each finger processor, and the timing of the finger processor is moved based on this timing error estimate prior to performing detection.

3. Non-Causal Pilot Filtering (NCP)

Non-causal pilot filtering (NCP) provides pilot estimates used for detection of a paging indicator. The paging indicator (PI) transmission during any pilot symbol period is called a PI symbol. The paging indicator may span 1, 2, 4 or 8 pilot symbol periods and may thus comprise 1, 2, 4 or 8 PI symbols. NCP provides (1) a pilot estimate for each PI symbol for non-STTD and (2) two pilot estimates for two base station antennas for each pair of PI symbols for STTD.

FIG. 11A shows an embodiment of performing NCP for one PI symbol for non-STTD. L+1 pilot symbols centered around the PI symbol are used to derive a pilot estimate for the PI symbol. The pilot estimate may be derived based on a FIR filter, as follows:

$$\hat{P}_n = \sum_{\ell=-L/2}^{L/2} P_{n+\ell} \cdot W_\ell, \quad \text{Eq (12)}$$

where
$W_\ell$ is the coefficient for the l-th FIR filter tap; and
$\hat{P}_n$ is the pilot estimate for PI symbol period n.

The FIR filter length L+1 and coefficients may be selected to provide good performance for different channel conditions. FIR filter lengths of 5, 7 and 9 provide good performance for the tested channel conditions, but other FIR filter lengths may also be used. The coefficients may be selected to be all ones, in which case the pilot estimate is obtained by simply accumulating L+1 pilot symbols centered around the PI symbol. Other values may also be used for the coefficients.

For STTD, the paging indicator may be transmitted in 1, 2, or 4 PI symbol pairs from two antennas. For each PI symbol pair, symbols $s_a$ and $s_b$ are transmitted from antenna 1 and symbols $-s^*_b$ and $s^*_a$ are transmitted from antenna 2, as shown in FIG. 4C.

FIG. 11B shows an embodiment of performing NCP for one PI symbol pair for STTD. The PI symbol pair may be transmitted starting in any pilot symbol period. A pilot estimate for each antenna is needed in order to perform STTD decoding of the PI symbol pair. The pilot estimate for each antenna may be obtained by filtering equal number of "S" and "D" pilot symbols. Referring back to FIG. 3, the pilot pattern for antenna 2 has a discontinuity at the CPICH frame boundary so that (1) a single "−A" symbol is transmitted between two "A" symbols at the end of a CPICH frame and (2) a single "A" symbol is transmitted between two "−A" symbols at the start of the CPICH frame. Hence, depending on the starting position of a PI symbol pair relative to the CPICH frame, different FIR filter lengths may be used to ensure that equal number of "S" and "D" pilot symbols are filtered for the PI symbol pair, as shown in FIG. 11B. The 150 pilot symbol periods in each CPICH frame may be given indices of 0 through 149. The FIR filter length L may be selected to be (1) L=2, 6, 10 or some other value if the PI symbol pair starts on an even-index pilot symbol period (not shown in FIG. 11B) and (2) L=4, 8 or some other value if the PI symbol pair starts on an odd-index pilot symbol period (as shown in FIG. 11B).

The pilot estimates for the two antennas may be derived based on FIR filters, as follows:

$$\hat{P}_{1,n} = \sum_{\ell=-L/2}^{L/2+1} P_{n+\ell} \cdot W_\ell, \quad \text{and}$$

$$\hat{P}_{2,n} = \sum_{\ell=-L/2}^{L/2+1} P_{n+\ell} \cdot W_\ell \cdot K_{n+\ell}, \quad \text{Eq (13)}$$

where
$K_n$ is equal to +1 for "S" pilot symbols and −1 for "D" pilot symbols; and
$\hat{P}_{1,n}$ and $\hat{P}_{2,n}$ are pilot estimates for antennas 1 and 2, respectively, for the PI symbol pair starting in PI symbol period n.

The weights $W_\ell$ may be selected to be all ones or some other values. Equation (13) shows two non-causal FIR filters used for two antennas. Each non-causal FIR filter is defined by a set of weights $W_\ell$ and a set of gains $K_n$, where the gains are dependent on the antenna and the symbol period n.

Figure 11C:
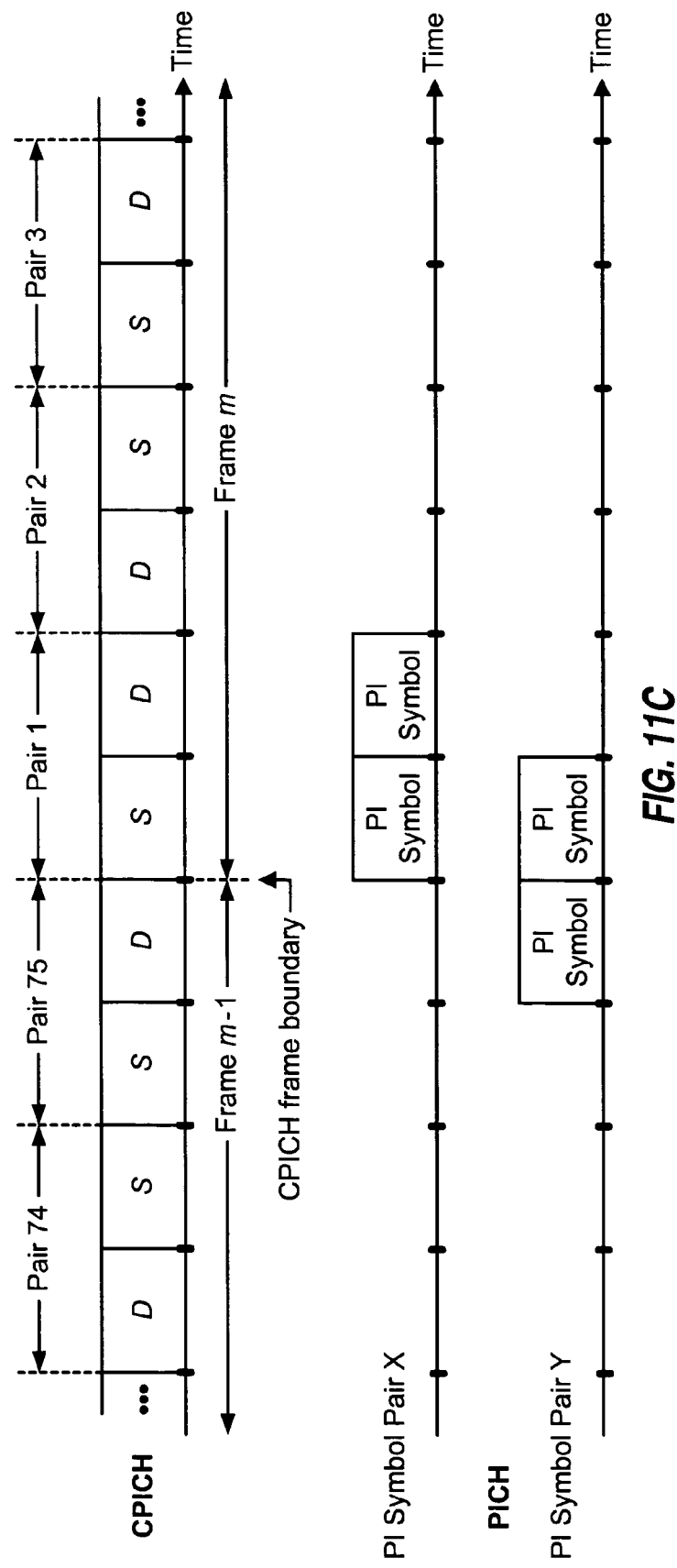

FIG. 11C shows another embodiment of performing NCP for different PI symbol pairs for STTD. For this embodiment, the 150 pilot symbols in each CPICH frame are arranged into 75 pilot symbol pairs that are denoted as pair 1 through pair 75. A given PI symbol pair may be time aligned with a pilot symbol pair or may span across two pilot symbol pairs. For example, PI symbol pair X in FIG. 11C is time aligned with pilot symbol pair 1, and PI symbol pair Y in FIG. 11C spans across pilot symbol pair 75 in a prior CPICH frame and pilot symbol pair 1 in the current CPICH frame.

If a PI symbol pair is time aligned with a pilot symbol pair, then NCP may be performed using the pilot symbol pairs surrounding this PI symbol pair to obtain pilot estimates for the two antennas, e.g., as shown in equation (13). For the example shown in FIG. 11C, pilot symbol pairs 74, 75, 1, 2, 3 may be used to obtain pilot estimates for PI symbol pair X. The number of pilot symbol pairs used to derive the pilot estimates may be configurable.

If a PI symbol pair spans two pilot symbol pairs, then NCP may be performed using various combinations of pilot symbol pairs surrounding this PI symbol pair. For the example shown in FIG. 11C, the pilot estimates for PI symbol pair Y may be obtained based on any one of the following schemes.

1. Use pilot symbol pairs 74, 75 and 1 to obtain the pilot estimates for the two antennas as shown in equation (13).
2. Use pilot symbol pairs 75, 1 and 2 to obtain the pilot estimates for the two antennas as shown in equation (13).
3. Use pilot symbol pairs 74, 75 and 1 to obtain two sets of pilot estimate(s) for the two antennas, use pilot symbol pairs 75, 1 and 2 to obtain another two sets of pilot estimate(s) for the two antennas, and jointly use these four sets of pilot estimate(s) for the two antennas to perform STTD decoding of the PI symbol pair.
4. Use pilot symbol pairs 74, 75 and 1 to obtain two set of pilot estimate(s) for the two antennas, use pilot symbol pairs 75, 1 and 2 to obtain another two sets of pilot estimate(s) for the two antennas, average the two sets of pilot estimate(s) for each antenna to obtain a set of averaged pilot estimate(s) for that antenna, and use the two sets of averaged pilot estimate(s) for the two antennas to perform STTD decoding of the PI symbol pair.

For cases 1 and 2 above, the non-causal FIR filters for the two antennas are non-symmetric about the PI symbol pair and operate on unequal numbers of pilot symbols on the left and right sides of the PI symbol pair. For example, if pilot symbol pairs 74, 75 and 1 are used, then there are two pilot symbol pairs 74 and 75 on the left side of the PI symbol pair and one pilot symbol pair 1 on the right side of the PI symbol pair.

For cases 3 and 4 above, two non-causal FIR filters operate on a first set of pilot symbols (e.g., pilot symbol pairs 74, 75 and 1) to generate two sets of pilot estimate(s) for the two antennas, and another two non-causal FIR filters operate on a second set of pilot symbols (e.g., pilot symbol pairs 75, 1 and 2) to generate another two sets of pilot estimate(s) for the two antennas. Four sets of pilot estimate(s) are obtained for the two antennas, where each set contains one or more pilot estimates. The two sets of pilot estimate(s) for each antenna may be averaged, and the two sets of averaged pilot estimate(s) may be used for STTD decoding, as described below. Alternatively, the four sets of pilot estimate(s) for the two antennas may be used for joint STTD decoding, as also described below.

4. Paging Indicator Detection

Figure 12A:
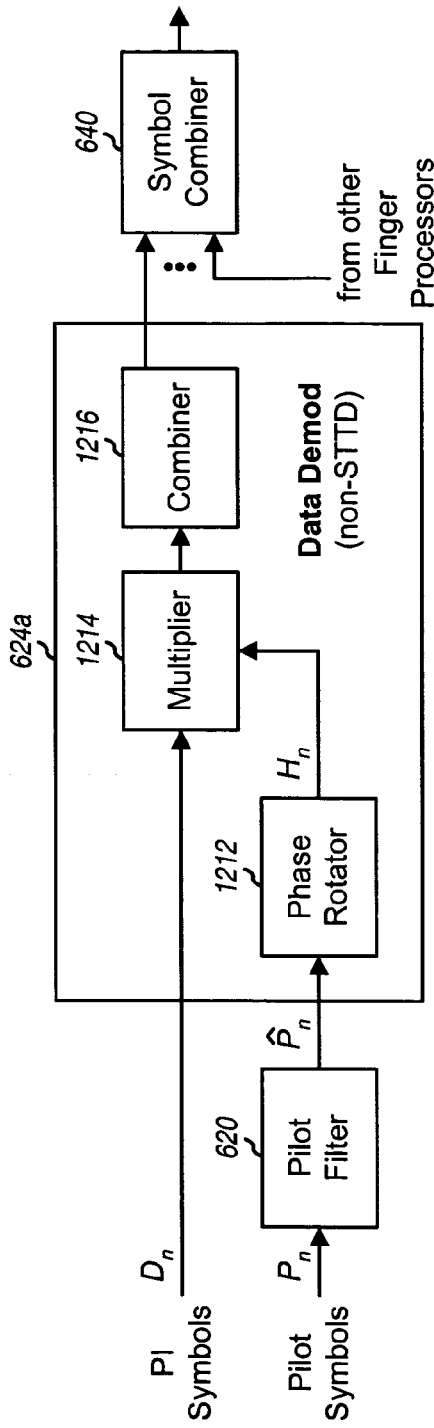
FIGS. 12A and 12B show data demodulators for non-STTD and STTD, respectively.

FIG. 12A shows a block diagram of an embodiment of a data demodulator 624a for non-STTD. NCP pilot filter 620 filters the pilot symbols $P_n$ with a non-causal FIR filter and provides a pilot estimate $\hat{P}_n$ for each PI symbol. Within demodulator 624a, a phase rotator 1212 multiplies each pilot estimate with 1−j1 and provides a corresponding channel gain estimate $H_n$. The multiplication with 1−j1 rotates the pilot estimate by −45° and removes the pilot modulation since A=1+j1. A multiplier 1214 receives the PI symbols from data despreader 622 and the channel gain estimates from rotator 1212. Multiplier 1214 multiplies each PI symbol with the associated channel gain estimate and provides a complex-value demodulated symbol. Each bit on the PICH is transmitted on either the I or Q component of a QPSK modulation symbol. A combiner 1216 sums the real and imaginary parts of each demodulated symbol and provides a detected paging indicator value for the corresponding PI symbol.

Symbol combiner 640 receives and combines the detected values from all assigned finger processors for each PI symbol. Symbol combiner 640 also accumulates the detected values over all PI symbols for the paging indicator and provides a final detected value for the paging indicator. The final detected value may be compared against a predetermined threshold to determine whether the transmitted paging indicator was set to '1' or '0'.

Figure 12B:
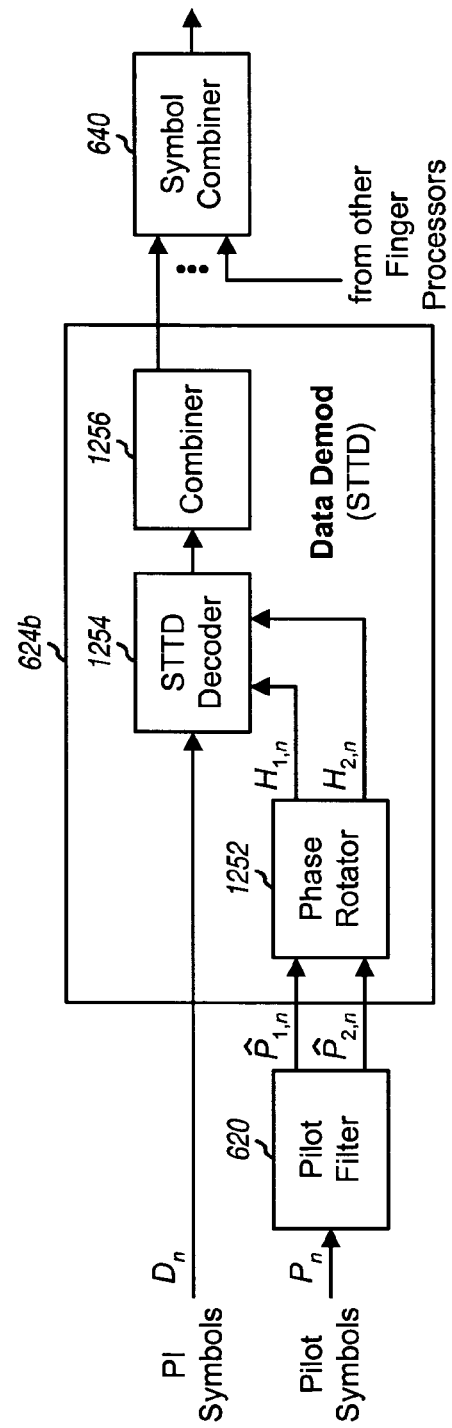

FIG. 12B shows a block diagram of an embodiment of a data demodulator 624b for STTD. NCP pilot filter 620 filters the pilot symbols $P_n$ with non-causal FIR filters and provides pilot estimates $\hat{P}_{1,n}$ and $\hat{P}_{2,n}$ for antennas 1 and 2, respectively, for each PI symbol pair. Within demodulator 624b, a phase rotator 1252 receives the pilot estimates $\hat{P}_{1,n}$ and $\hat{P}_{2,n}$ X rotates each pilot estimate by −45°, and provides channel gain estimates $H_{1,n}$ and $H_{2,n}$ for antennas 1 and 2, respectively, for each PI symbol pair. An STTD decoder 1254 receives the PI symbols from data despreader 622 and the channel gain estimates and performs STTD decoding, as follows:

$$\hat{S}_n = H^*_{1,n} \cdot D_n + H_{2,n} \cdot D^*_{n+1}, \text{ and}$$

$$S_{n+1} = -H_{2,n} \cdot D^*_n + H^*_{1,n} \cdot D_{n+1}, \quad \text{Eq (14)}$$

where
$D_n$ and $D_{n+1}$ are PI symbols for PI symbol periods n and n+1, respectively;
$\hat{S}_n$ and $\hat{S}_{n+1}$ are estimates of the transmitted PI symbols for PI symbol periods n and n+1, respectively; and
"*" denotes a complex conjugate.

A combiner 1256 sums the real and imaginary parts of $\hat{S}_n$ and $\hat{S}_{n+1}$ and provides a detected value for the PI symbol pair. Symbol combiner 640 combines the detected values from all assigned finger processors and across all PI symbol pairs for the paging indicator and provides a final detected value for the paging indicator.

Joint STTD decoding may be performed in various manners with four sets of pilot estimate(s) for the two antennas. For example, the $D_n$ PI symbol may be multiplied with channel gain estimates obtained from the two sets of pilot estimate(s) derived from the first set of pilot symbols, and the $D_{n+1}$ PI symbol may be multiplied with channel gain estimates obtained from the other two sets of pilot estimate(s) derived from the second set of pilot symbols.

Figure 13:
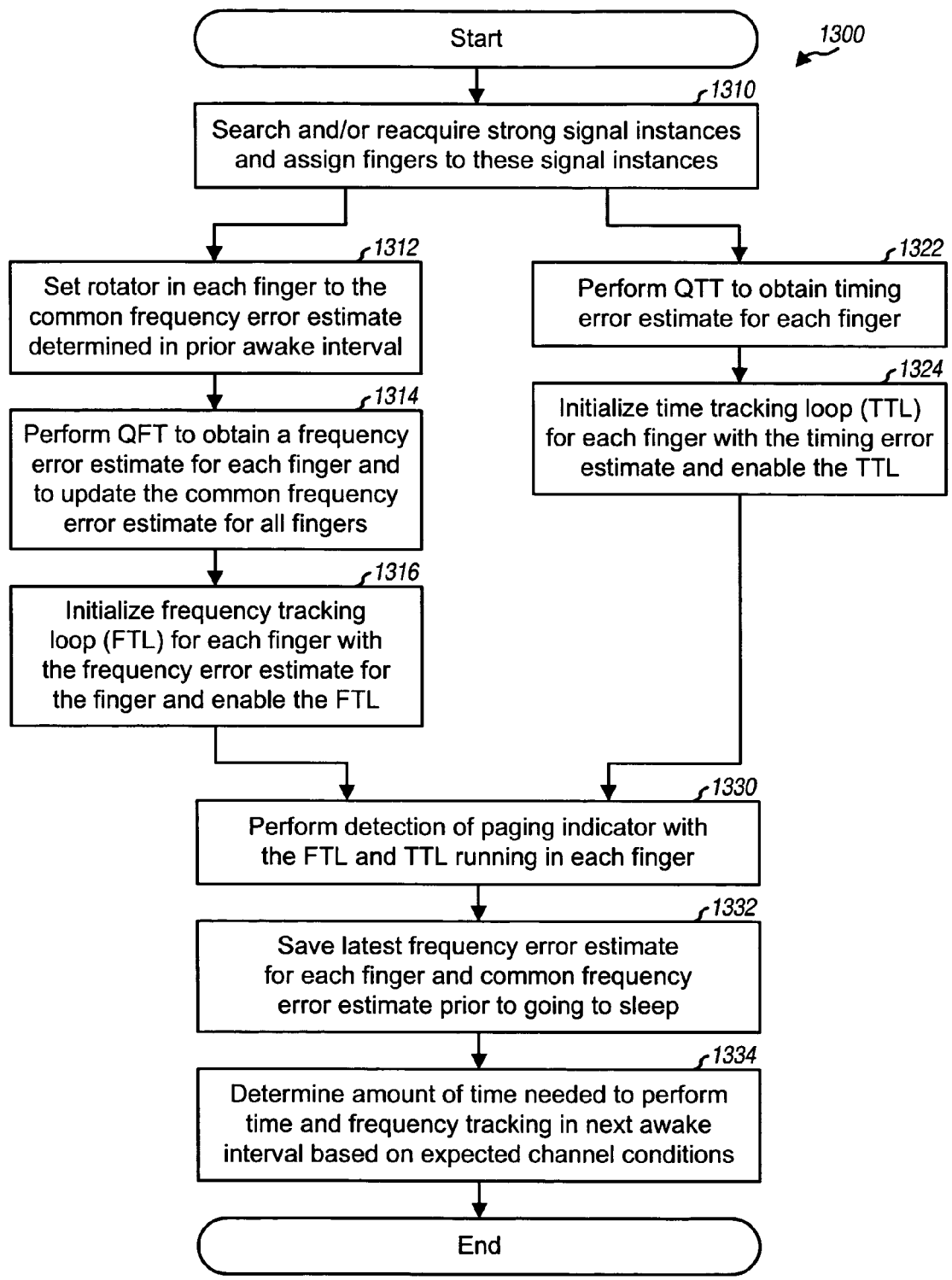
FIG. 13 shows a PICH detection process with QFT, QTT, and NCP.

FIG. 13 shows a process 1300 for performing PICH detection with QFT, QTT, and NCP. Prior to going to sleep in the prior awake interval, the amount of time needed to perform frequency tracking in the current awake interval is determined based on the expected channel conditions. The coherent accumulation length $N_{fc}$ for QFT and the coherent and non-coherent accumulation lengths $N_{tc}$ and $N_{tnc}$ for QTT may be reduced for favorable channel conditions (e.g., if $E_c/I_o$ is above a predetermined threshold) in order to reduce the amount of time allocated for QFT and QTT. In any case, the wireless device wakes up prior to the paging indicator in the current awake interval by an amount of time determined in the prior awake interval.

For the current awake interval, the wireless device wakes up at the determined time and searches for strong signal instances and/or reacquires strong signal instances identified in the prior awake interval (block 1310). The common frequency error estimate from the prior awake interval is used for the search/reacquisition in the current awake interval. The searcher provides the strength and timing (e.g., to chip×2 resolution) of each found signal instance that meets a set of criteria. A finger processor is assigned to process each signal instance of interest.

For frequency tracking, the rotator within each assigned finger processor is set to the common frequency error estimate from the prior awake interval (block 1312). QFT is then performed to obtain a frequency error estimate for each finger processor and to update the common frequency error estimate for all finger processors (block 1314). The frequency error estimate for each finger processor is equal to the frequency error estimate provided by the QFT for that finger processor minus the common frequency error estimate and is the residual frequency error for the finger processor. The oscillator is slowly updated with the common frequency error estimate. The feedback based frequency tracking loop for each finger processor is initialized with the frequency error estimate for that finger processor and enabled (block 1316). The frequency tracking loop for each finger processor thereafter continually estimates the phase of the pilot symbols and updates the frequency error estimate for that finger processor.

For time tracking, QTT is performed to obtain a timing error estimate for each finger processor (block 1322). The time tracking loop for each finger processor is initialized with the timing error estimate and enabled (block 1324). The time tracking loop thereafter continually estimates the timing of the pilot symbols and updates the timing error estimate. QTT may be performed in parallel with QFT to reduce the awake duration, as indicated by the two paths for frequency and time tracking in FIG. 13.

After blocks 1316 and 1324, for each finger processor, the rotator is operated based on the output from the frequency tracking loop, and the sampling unit is operated based on the output from the time tracking loop, as shown in FIG. 6. Detection of the paging indicator is performed with the frequency and time tracking loops running in each finger processor and using NCP (block 1330). Prior to going to sleep, the latest values of the common frequency error estimate are saved (block 1332). The amount of time required to perform frequency and time tracking in the next awake interval is determined based on the expected channel conditions (block 1334). The timer is set appropriately, and the wireless device goes to sleep until the timer expires.

Detection performance with NCP was evaluated and compared against detection performance with a causal infinite impulse response (IIR) filter. It can be shown that NCP improves detection performance for certain operating scenarios including high speed. Detection performance is also more resilient to frequency error with NCP, which can effectively deal with a potentially large residual frequency error from QFT. The resiliency to frequency error may also be exploited to reduce the amount of time allocated for frequency tracking or to possibly eliminate frequency tracking prior to performing detection.

QFT, QTT, and NCP may be used by a wireless device to reduce RF awake time per awake interval during DRX operation in the idle mode. QFT, QTT, and NCP take less time to perform and provide better performance than conventional schemes for frequency tracking, time tracking, and pilot filtering, respectively. A key advantage of QFT, QTT, and NCP is reduced battery power consumption and extended battery standby time. Other advantages from using NCP include improved detection performance under high frequency dynamics and flexibility to perform frequency tracking after (instead of before) paging indicator detection.

For clarity, specific embodiments of QFT, QTT, and NCP have been described above. QFT, QTT, and NCP may also be performed in other manners, and this is within the scope of the invention. For example, QFT, QTT, and NCP may be performed based on descrambled samples instead of pilot symbols. In this case, coherent accumulation and non-coherent accumulation are performed on samples. Any one, any combination, or all three techniques may be used for PICH detection.

For clarity, QFT, QTT, and NCP have been specifically described for detection of paging indicators in W-CDMA. In general, these techniques may be used for detection of various types of signaling such as indicators, bits, symbols, acknowledgments, requests, and so on. These techniques may be used for W-CDMA and other wireless communication systems.

Figure 14:
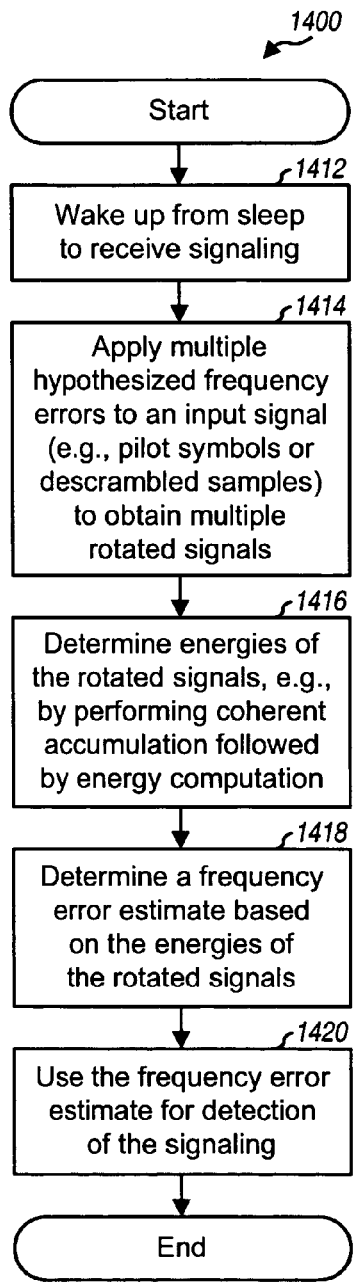
FIG. 14 shows a process for performing QFT during DRX operation.

FIG. 14 shows a process 1400 for performing QFT for receiving sporadically transmitted signaling (e.g., paging indicators) in a wireless communication system. Initially, the wireless device wakes up from sleep to receive signaling during DRX operation (block 1412). Multiple hypothesized frequency errors are applied to an input signal (e.g., pilot symbols or descrambled samples) to obtain multiple rotated signals (block 1414). The energies of the rotated signals are determined, e.g., by performing coherent accumulation followed by energy computation (block 1416). A frequency error estimate is determined based on the energies of the rotated signals (block 1418) and used for detection of the signaling (block 1420).

Figure 15:
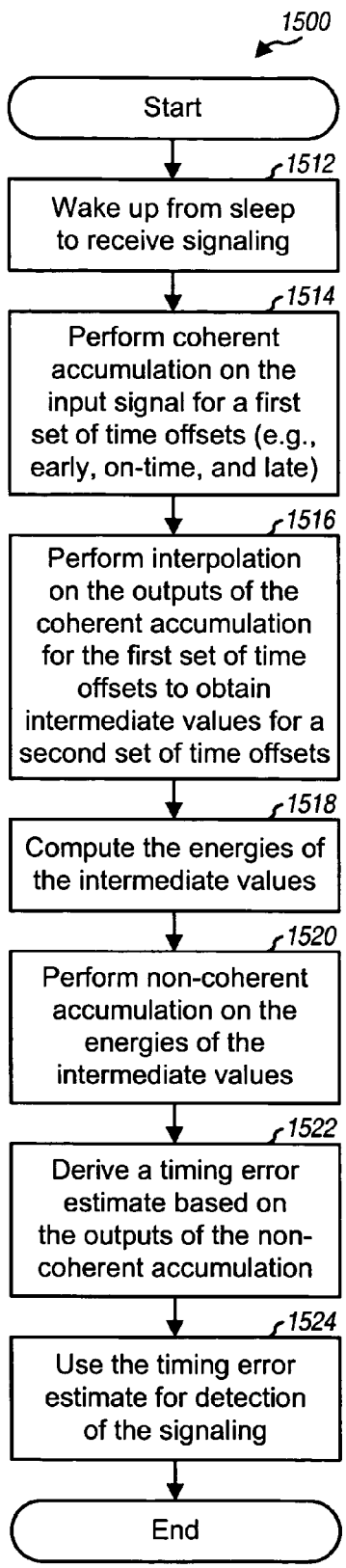
FIG. 15 shows a process for performing QTT during DRX operation.

FIG. 15 shows a process 1500 for performing QTT for receiving sporadically transmitted signaling in the wireless communication system. Initially, the wireless device wakes up from sleep to receive signaling (block 1512). Coherent accumulation is performed on the input signal for a first set of time offsets (e.g., early, on-time, and late) (block 1514). Interpolation may be performed on the outputs of the coherent accumulation for the first set of time offsets to obtain intermediate values for a second set of time offsets (e.g., at chip×8 resolution) (block 1516). The energies of the intermediate values may be computed (block 1518), and non-coherent accumulation may be performed on the energies of the intermediate values for the second set of time offsets (block 1520). A timing error estimate is derived based on the outputs of the non-coherent accumulation (block 1522) and used for detection of the signaling (block 1524).

Figure 16:
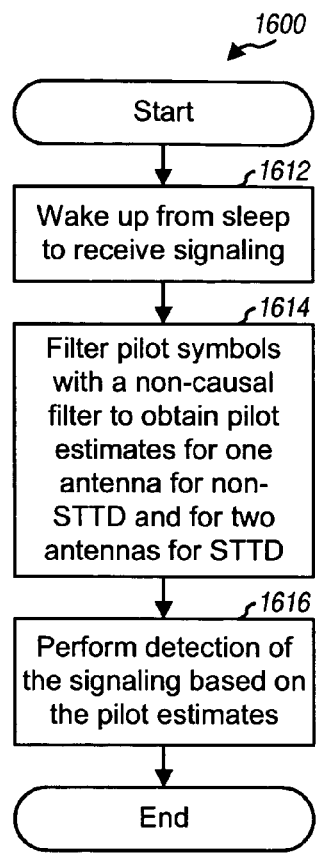
FIG. 16 shows a process for performing NCP during DRX operation.

FIG. 16 shows a process 1600 for performing NCP for receiving sporadically transmitted signaling in the wireless communication system. Initially, the wireless device wakes up from sleep to receive signaling (block 1612). Pilot symbols are filtered with a non-causal filter to obtain pilot estimates for one antenna for non-STTD and for two antennas for STTD (block 1614). Detection of the signaling is then performed based on the pilot estimates, as described above (block 1616).

The techniques described herein may be implemented by various means. For example, these techniques may be implemented in hardware, software, or a combination thereof. For a hardware implementation, the processing units used to perform any one, any combination, or all of the techniques (e.g., pilot filter 620 in FIG. 6, QFT units 638a in FIG. 8A, QFT unit 638b in FIG. 8B, QTT unit 634a in FIG. 10, and so on) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a software implementation, the techniques described herein may be implemented with modules (e.g., procedures, functions, and so on) that perform the functions described herein. The software codes may be stored in a memory unit (e.g., memory unit 572 in FIG. 5) and executed by a processor (e.g., controller 570). The memory unit may be implemented within the processor or external to the processor.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus, comprising:
a processor operative to perform quick frequency tracking to obtain at least one frequency error estimate for at least one finger processor and to perform quick time tracking to obtain at least one timing error estimate for the at least one finger processor; and
a demodulator operative to perform detection for signaling with the at least one frequency error estimate and the at least one timing error estimate for the at least one finger processor;
wherein the quick frequency tracking comprises an open-loop frequency estimation technique; and
wherein the demodulator is operative to filter pilot symbols with a non-causal filter to obtain pilot estimates and to perform detection for the signaling based on the pilot estimates.

2. The apparatus of claim 1, wherein the processor is operative, for each finger processor, to perform coherent accumulation to obtain energies for a plurality of hypothesized frequency errors and to determine a frequency error estimate for the finger processor based on the energies for the plurality of hypothesized frequency errors.

3. The apparatus of claim 1, wherein the processor is operative, for each finger processor, to perform coherent accumulation, interpolation, and non-coherent accumulation to obtain energies for a plurality of time offsets and to determine a timing error estimate for the finger processor based on the energies for the plurality of time offsets.

4. The apparatus of claim 1, wherein the processor is operative to perform quick frequency tracking and quick time tracking in parallel.

5. The apparatus of claim 1, wherein the controller is operative to determine an amount of time to perform quick frequency tracking and quick time tracking in a next awake interval based on expected channel conditions and to determine a sleep duration based on the amount of time to perform quick frequency tracking and quick time tracking in the next awake interval.

6. The apparatus of claim 1, wherein the processor is operative to perform detection for a paging indicator sent at a predetermined time interval.

7. The apparatus of claim 1, further comprising:
a rotator coupled to the processor;
a sampling unit coupled to the processor; and
a descrambler coupled to the rotator for descrambling rotated signals from the rotator,
wherein the processor is operative, for each finger processor, to provide the at least one frequency error estimate to the rotator, the rotator for performing phase rotation on output samples from the sampling unit responsive to the at least one frequency error estimate and providing the rotated signals to the descrambler.

8. The apparatus of claim 1, wherein the quick time tracking comprises an open-loop timing estimation technique.

9. A method, comprising:
performing quick frequency tracking to obtain at least one frequency error estimate for at least one finger processor;
performing quick time tracking to obtain at least one timing error estimate for the at least one finger processor;
performing detection of signaling with the at least one frequency error estimate and the at least one timing error estimate for the at least one finger processor;
wherein the quick time tracking comprises an open-loop timing estimation technique; and
filtering pilot symbols with a non-causal filter to obtain pilot estimates, and wherein the detection of the signaling is performed based on the pilot estimates.

10. The method of claim 9, wherein the performing quick frequency tracking comprises, for each finger processor,
performing coherent accumulation to obtain energies for a plurality of hypothesized frequency errors, and
determining a frequency error estimate for the finger processor based on the energies for the plurality of hypothesized frequency errors.

11. The method of claim 10, further comprising performing phase rotation on signals from a sampling unit responsive to the at least one frequency error estimate.

12. The method of claim 9, wherein the performing quick time tracking comprises, for each finger processor,
performing coherent accumulation, interpolation, and non-coherent accumulation to obtain energies for a plurality of time offsets, and
determining a timing error estimate for the finger processor based on the energies for the plurality of time offsets.

13. The method of claim 12, wherein the performing of the coherent accumulation comprises performing the coherent accumulation on an input signal for a first plurality of time offsets;
wherein the performing of the interpolation comprises performing interpolation from the first plurality of time offsets to a second plurality of time offsets; and
wherein the performing of the non-coherent accumulation comprises performing the non-coherent accumulation after the performing of the interpolation to obtain the timing error estimate.

14. The method of claim 9, further comprising:
determining an amount of time to perform quick frequency tracking and quick time tracking in a next awake interval based on expected channel conditions; and
determining a sleep duration based on the amount of time to perform quick frequency tracking and quick time tracking in the next awake interval.

15. The method of claim 9, wherein the quick frequency tracking comprises an open-loop frequency estimation technique.

16. An apparatus, comprising:
means for performing quick frequency tracking to obtain at least one frequency error estimate for at least one finger processor;
means for performing quick time tracking to obtain at least one timing error estimate for the at least one finger processor;
means for performing detection of signaling with the at least one frequency error estimate and the at least one timing error estimate for the at least one finger processor;
wherein the quick frequency tracking comprises an open-loop frequency estimation technique; and
means for filtering pilot symbols with a non-causal filter to obtain pilot estimates, and wherein the detection of the signaling is performed based on the pilot estimates.

17. The apparatus of claim 16, wherein the means for performing quick frequency tracking comprises, for each finger processor,
means for performing coherent accumulation to obtain energies for a plurality of hypothesized frequency errors, and
means for determining a frequency error estimate for the finger processor based on the energies for the plurality of hypothesized frequency errors.

18. The apparatus of claim 17, further comprising means for performing phase rotation on signals from a sampling unit responsive to the at least one frequency error estimate.

19. The apparatus of claim 16, wherein the means for performing quick time tracking comprises, for each finger processor,
means for performing coherent accumulation, interpolation, and non-coherent accumulation to obtain energies for a plurality of time offsets, and
means for determining a timing error estimate for the finger processor based on the energies for the plurality of time offsets.

20. The apparatus of claim 19, wherein the means for performing the coherent accumulation comprises means for performing the coherent accumulation on an input signal for a first plurality of time offsets;
wherein the means for performing the interpolation comprises means for performing interpolation from the first plurality of time offsets to a second plurality of time offsets; and
wherein the means for performing of the non-coherent accumulation comprises means for performing the non-coherent accumulation after the performing of the interpolation to obtain the timing error estimate.

21. The apparatus of claim 16, wherein the quick time tracking comprises an open-loop timing estimation technique.

22. An apparatus, comprising:
a processor operative to perform quick frequency tracking to obtain at least one frequency error estimate for at least one finger processor and to perform quick time tracking to obtain at least one timing error estimate for the at least one finger processor; and
a demodulator operative to perform detection for signaling with the at least one frequency error estimate and the at least one timing error estimate for the at least one finger processor,
wherein the quick frequency tracking comprises an open-loop frequency estimation technique
a rotator coupled to the processor;
a sampling unit coupled to the processor; and
a descrambler coupled to the rotator for descrambling rotated signals from the rotator,
wherein the processor is operative, for each finger processor, to provide the at least one frequency error estimate to the rotator, the rotator for performing phase rotation on output samples from the sampling unit responsive to the at least one frequency error estimate and providing the rotated signals to the descrambler
wherein the processor is operative, for each finger processor, to identify a largest energy among energies of the rotated signals and to provide a hypothesized frequency error corresponding to the largest energy as the frequency error estimate.

23. The apparatus of claim 22, wherein the processor is operative, for each finger processor, to perform coherent accumulation to obtain energies for a plurality of hypothesized frequency errors and for a plurality of time offsets, and to determine a frequency error estimate and a timing error estimate for the finger processor based on the energies for the plurality of hypothesized frequency errors and the plurality of time offsets, respectively.

24. An apparatus comprising:
a processor operative to perform quick frequency tracking to obtain at least one frequency error estimate for at least one finger processor and to perform quick time tracking to obtain at least one timing error estimate for the at least one finger processor;
a demodulator operative to perform detection for signaling with the at least one frequency error estimate and the at least one timing error estimate for the at least one finger processor;
wherein the quick frequency tracking comprises an open-loop frequency estimation technique;
a rotator coupled to the processor;
a sampling unit coupled to the processor; and
a receiver unit coupled to the at least one finger processor;
wherein the processor is operative, for each finger processor, to provide the at least one timing error estimate to the sampling unit, the sampling unit for receiving input samples from the receiver unit and providing output samples at a different sampling rate from that of the input samples to the rotator.

25. The apparatus of claim 24, wherein the sampling rate of the output samples is two times chip rate.

26. The apparatus of claim 24, wherein the processor is operative, for each finger processor, to perform coherent accumulation on an input signal for a first plurality of time offsets, to perform interpolation from the first plurality of time offsets to a second plurality of time offsets, and to perform non-coherent accumulation after the interpolation to obtain the timing error estimate.

27. The apparatus of claim 26, wherein the processor is operative, for each finger processor, to perform linear interpolation on outputs of the coherent accumulation for the first plurality of time offsets to obtain intermediate values for the second plurality of time offsets and to perform non-coherent accumulation based on the intermediate values.

28. The apparatus of claim 27, wherein the processor is operative, for each finger processor, to compute energies of the intermediate values for the second plurality of time offsets and to perform non-coherent accumulation based on the energies of the intermediate values for the second plurality of time offsets.

29. The apparatus of claim 28, wherein the processor is operative, for each finger processor, to identify a largest energy among non-coherently accumulated energies for the second plurality of time offsets and to provide a time offset corresponding to the largest energy as the timing error estimate.

30. The apparatus of claim 26, wherein the processor is operative, for each finger processor, to perform parabolic interpolation on outputs of the non-coherent accumulation for the first plurality of time offsets.

31. A method, comprising:
performing quick frequency tracking to obtain at least one frequency error estimate for at least one finger processor;
performing quick time tracking to obtain at least one timing error estimate for the at least one finger processor;
performing detection of signaling with the at least one frequency error estimate and the at least one timing error estimate for the at least one finger processor;
wherein the quick time tracking comprises an open-loop timing estimation technique;
wherein the performing quick frequency tracking comprises, for each finger processor:
performing coherent accumulation to obtain energies for a plurality of hypothesized frequency errors;
determining a frequency error estimate for the finger processor based on the energies for the plurality of hypothesized frequency errors; and
performing phase rotation on signals from a sampling unit responsive to the at least one frequency error estimate;
wherein the determining of the frequency error estimate for the finger processor comprises identifying a largest energy among energies of rotated signals and identifying a hypothesized frequency error corresponding to the largest energy as the frequency error estimate.

32. The method of claim 31, wherein the performing quick frequency tracking comprises, for each finger processor:
performing coherent accumulation to obtain energies for a plurality of hypothesized frequency errors; and
determining a frequency error estimate for the finger processor based on the energies for the plurality of hypothesized frequency errors;
wherein the performing quick time tracking comprises, for each finger processor:
performing coherent accumulation, interpolation, and non-coherent accumulation to obtain energies for a plurality of time offsets; and
determining a timing error estimate for the finger processor based on the energies for the plurality of time offsets.

33. A method, comprising:
performing quick frequency tracking to obtain at least one frequency error estimate for at least one finger processor;
performing quick time tracking to obtain at least one timing error estimate for the at least one finger processor;

performing detection of signaling with the at least one frequency error estimate and the at least one timing error estimate for the at least one finger processor;
wherein the quick time tracking comprises an open-loop timing estimation technique;
wherein the performing quick time tracking comprises, for each finger processor:
  performing coherent accumulation, interpolation, and non-coherent accumulation to obtain energies for a plurality of time offsets;
  determining a timing error estimate for the finger processor based on the energies for the plurality of time offsets;
wherein the performing of the coherent accumulation comprises performing the coherent accumulation on an input signal for a first plurality of time offsets;
wherein the performing of the interpolation comprises performing interpolation from the first plurality of time offsets to a second plurality of time offsets;
wherein the performing of the non-coherent accumulation comprises performing the non-coherent accumulation after the performing of the interpolation to obtain the timing error estimate; and
performing linear interpolation on outputs of the coherent accumulation for the first plurality of time offsets to obtain intermediate values for the second plurality of time offsets;
wherein the performing of the non-coherent accumulation is based on the intermediate values.

34. The method of claim 33, further comprising computing energies of the intermediate values for the second plurality of time offsets,
wherein the performing of the non-coherent accumulation is based on the energies of the intermediate values for the second plurality of time offsets.

35. The method of claim 34, further comprising identifying a largest energy among non-coherently accumulated energies for the second plurality of time offsets,
wherein the timing error estimate for the finger processor comprises a time offset corresponding to the largest energy.

36. An apparatus, comprising:
means for performing quick frequency tracking to obtain at least one frequency error estimate for at least one finger processor;
means for performing quick time tracking to obtain at least one timing error estimate for the at least one finger processor;
means for performing detection of signaling with the at least one frequency error estimate and the at least one timing error estimate for the at least one finger processor;
wherein the quick frequency tracking comprises an open-loop frequency estimation technique;
wherein the means for performing quick frequency tracking comprises, for each finger processor:
  means for performing coherent accumulation to obtain energies for a plurality of hypothesized frequency errors; and
  means for determining a frequency error estimate for the finger processor based on the energies for the plurality of hypothesized frequency errors; and
means for performing phase rotation on signals from a sampling unit responsive to the at least one frequency error estimate;
wherein the means for determining the frequency error estimate for the finger processor comprises means for identifying a largest energy among energies of the rotated signals and means for identifying a hypothesized frequency error corresponding to the largest energy as the frequency error estimate.

37. The apparatus of claim 36, wherein the means for performing quick frequency tracking comprises, for each finger processor:
means for performing coherent accumulation to obtain energies for a plurality of hypothesized frequency errors; and
means for determining a frequency error estimate for the finger processor based on the energies for the plurality of hypothesized frequency errors;
wherein the means for performing quick time tracking comprises, for each finger processor:
  means for performing coherent accumulation, interpolation, and non-coherent accumulation to obtain energies for a plurality of time offsets; and
  means for determining a timing error estimate for the finger processor based on the energies for the plurality of time offsets.

38. An apparatus, comprising:
means for performing quick frequency tracking to obtain at least one frequency error estimate for at least one finger processor;
means for performing quick time tracking to obtain at least one timing error estimate for the at least one finger processor;
means for performing detection of signaling with the at least one frequency error estimate and the at least one timing error estimate for the at least one finger processor;
wherein the quick frequency tracking comprises an open-loop frequency estimation technique;
wherein the means for performing quick time tracking comprises, for each finger processor:
  means for performing coherent accumulation, interpolation, and non-coherent accumulation to obtain energies for a plurality of time offsets; and
  means for determining a timing error estimate for the finger processor based on the energies for the plurality of time offsets;
wherein the means for performing the coherent accumulation comprises means for performing the coherent accumulation on an input signal for a first plurality of time offsets;
wherein the means for performing the interpolation comprises means for performing interpolation from the first plurality of time offsets to a second plurality of time offsets;
wherein the means for performing of the non-coherent accumulation comprises means for performing the non-coherent accumulation after the performing of the interpolation to obtain the timing error estimate; and
means for performing linear interpolation on outputs of the coherent accumulation for the first plurality of time offsets to obtain intermediate values for the second plurality of time offsets;
wherein the means for performing of the non-coherent accumulation is configured to base the performance of the non-coherent accumulation on the intermediate values.

39. The apparatus of claim 38, further comprising means for computing energies of the intermediate values for the second plurality of time offsets,
wherein the means for performing the non-coherent accumulation is configured to base the performance of the non-coherent accumulation on the energies of the intermediate values for the second plurality of time offsets.

40. The apparatus of claim 39, further comprising means for identifying a largest energy among non-coherently accumulated energies for the second plurality of time offsets, wherein the timing error estimate for the finger processor comprises a time offset corresponding to the largest energy.

41. A computer program product, comprising:
a non-transitory computer-readable medium, comprising:
codes for causing a computer to perform quick frequency tracking to obtain at least one frequency error estimate for at least one finger processor;
codes for causing a computer to perform quick time tracking to obtain at least one timing error estimate for the at least one finger processor;
codes for causing a computer to perform detection of signaling with the at least one frequency error estimate and the at least one timing error estimate for the at least one finger processor;
wherein the quick time tracking comprises an open-loop timing estimation technique; and
filtering pilot symbols with a non-causal filter to obtain pilot estimates, and wherein the detection of the signaling is performed based on the pilot estimates.

42. The computer program product of claim 41, wherein the codes for performing quick frequency tracking comprises, for each finger processor,
codes for causing a computer to perform coherent accumulation to obtain energies for a plurality of hypothesized frequency errors, and
codes for causing a computer to determine a frequency error estimate for the finger processor based on the energies for the plurality of hypothesized frequency errors.

43. The computer program product of claim 41, wherein the codes for performing quick time tracking comprises, for each finger processor,
codes for causing a computer to perform coherent accumulation, interpolation, and non-coherent accumulation to obtain energies for a plurality of time offsets, and
codes for causing a computer to determine a timing error estimate for the finger processor based on the energies for the plurality of time offsets.

44. The computer program product of claim 41, further comprising:
codes for causing a computer to determine an amount of time to perform quick frequency tracking and quick time tracking in a next awake interval based on expected channel conditions; and
codes for causing a computer to determine a sleep duration based on the amount of time to perform quick frequency tracking and quick time tracking in the next awake interval.

45. A computer program product, comprising:
a non-transitory computer-readable medium, comprising:
codes for causing a computer to perform quick frequency tracking to obtain at least one frequency error estimate for at least one finger processor;
codes for causing a computer to perform quick time tracking to obtain at least one timing error estimate for the at least one finger processor;
codes for causing a computer to perform detection of signaling with the at least one frequency error estimate and the at least one timing error estimate for the at least one finger processor;
wherein the quick time tracking comprises an open-loop timing estimation technique;
wherein the codes for performing quick frequency tracking comprises, for each finger processor:
codes for causing a computer to perform coherent accumulation to obtain energies for a plurality of hypothesized frequency errors;
codes for causing a computer to determine a frequency error estimate for the finger processor based on the energies for the plurality of hypothesized frequency errors; and
codes for causing a computer to perform phase rotation on signals from a sampling unit responsive to the at least one frequency error estimate;
wherein the determining of the frequency error estimate for the finger processor comprises identifiing a largest energy among energies of the rotated signals and identifiing a hypothesized frequency error corresponding to the largest energy as the frequency error estimate.

46. A computer program product, comprising:
a non-transitory computer-readable medium, comprising:
codes for causing a computer to perform quick frequency tracking to obtain at least one frequency error estimate for at least one finger processor;
codes for causing a computer to perform quick time tracking to obtain at least one timing error estimate for the at least one finger processor;
codes for causing a computer to perform detection of signaling with the at least one frequency error estimate and the at least one timing error estimate for the at least one finger processor;
wherein the quick time tracking comprises an open-loop timing estimation technique;
wherein the codes for performing quick time tracking comprises, for each finger processor:
codes for causing a computer to perform coherent accumulation, interpolation, and non-coherent accumulation to obtain energies for a plurality of time offsets;
codes for causing a computer to determine a timing error estimate for the finger processor based on the energies for the plurality of time offsets;
wherein the performing of the coherent accumulation comprises performing the coherent accumulation on an input signal for a first plurality of time offsets;
wherein the performing of the interpolation comprises performing interpolation from the first plurality of time offsets to a second plurality of time offsets; and
wherein the performing of the non-coherent accumulation comprises performing the noncoherent accumulation after the performing of the interpolation to obtain the timing error estimate; and
codes for causing a computer to perform linear interpolation on outputs of the coherent accumulation for the first plurality of time offsets to obtain intermediate values for the second plurality of time offsets;
wherein the performing of the non-coherent accumulation is based on the intermediate values.

47. The computer program product of claim 46, further comprising codes for causing a computer to compute energies of the intermediate values for the second plurality of time offsets,
wherein the performing of the non-coherent accumulation is based on the energies of the intermediate values for the second plurality of time offsets.

48. The computer program product of claim 47, further comprising codes for causing a computer to identify a largest energy among non-coherently accumulated energies for the second plurality of time offsets,
wherein the timing error estimate for the finger processor comprises a time offset corresponding to the largest energy.

* * * * *